United States Patent
Adam

(10) Patent No.: US 9,809,377 B2
(45) Date of Patent: Nov. 7, 2017

(54) FRUIT IN A BUBBLE WRAP MAT

(71) Applicant: Empire Technology Development LLC, Wilmington, DE (US)

(72) Inventor: Quentin Arthur Carl Adam, Lane Cove (AU)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/882,838

(22) Filed: Oct. 14, 2015

(65) Prior Publication Data

US 2017/0107048 A1    Apr. 20, 2017

(51) Int. Cl.
*B65D 85/34*    (2006.01)
*B65B 47/08*    (2006.01)
(Continued)

(52) U.S. Cl.
CPC ............... *B65D 85/34* (2013.01); *A23B 7/14* (2013.01); *A23B 7/152* (2013.01); *B65B 25/001* (2013.01);
(Continued)

(58) Field of Classification Search
CPC ........ B65D 81/03; B65D 81/24; B65D 81/26; B65D 85/34; B65D 85/345; B65D 85/62; B65D 53/00; B65D 73/00; B65D 75/367; B65D 77/02; B65D 81/266; B65D 81/264; B01J 20/00; B01J 20/02; B01J 20/22; B65B 47/08; B65B 61/007; B65B 51/02; B65B 25/001; B65B 53/00; B65B 25/04; B65B 25/041; B65B 31/00; B65B 31/02;
(Continued)

(56) References Cited

U.S. PATENT DOCUMENTS 2,490,781 A  * 12/1949  Cloud ................... B29C 51/225
                                                        26/92
2,749,245 A  *  6/1956  Peters .................... B65D 85/72
                                                       206/526
(Continued)

FOREIGN PATENT DOCUMENTS

EP        2055651 A1    5/2009

OTHER PUBLICATIONS

"Bubble wrap," accessed at http://web.archive.org/web/20140909021633/http://en.wikipedia.org/wiki/Bubble_wrap, last modified Aug. 11, 2014, pp. 1-5.
(Continued)

*Primary Examiner* — Michele L Jacobson
*Assistant Examiner* — Ericson M Lachica
(74) *Attorney, Agent, or Firm* — The Juhasz Law Firm, P.C.

(57) ABSTRACT

A package for compartmentalized preservation of harvested fruit or vegetables and methods are disclosed. The package may include a first flexible polymer film, comprising integral molded or vacuum formed cups configured to hold a fruit or vegetable, wherein the integral molded or vacuum formed cups can be collapsed into a plane of the first polymer film or extended from the first polymer film; and a second flexible polymer film configured to overlay the first polymer film. In some embodiments, the cups containing the fruit or vegetable may be inflated and sealed to form protective bubbles.

16 Claims, 11 Drawing Sheets

(51) Int. Cl.
    B65B 61/00    (2006.01)
    A23B 7/152    (2006.01)
    B65D 75/36    (2006.01)
    B65D 77/02    (2006.01)
    B65D 81/03    (2006.01)
    B65D 81/26    (2006.01)
    B65B 25/00    (2006.01)
    B65B 51/02    (2006.01)
    A23B 7/14     (2006.01)
    B65D 75/32    (2006.01)

(52) U.S. Cl.
    CPC .............. *B65B 47/08* (2013.01); *B65B 51/02* (2013.01); *B65B 61/007* (2013.01); *B65D 75/327* (2013.01); *B65D 75/367* (2013.01); *B65D 77/02* (2013.01); *B65D 81/03* (2013.01); *B65D 81/264* (2013.01); *B65D 81/266* (2013.01); *A23V 2002/00* (2013.01)

(58) Field of Classification Search
    CPC ........... B65B 31/04; A23B 7/14; A23B 7/152; A23L 3/3418; A23L 3/3427
    USPC ... 53/441, 434, 556, 512, 403, 79, 405, 473, 53/407, 432, 433, 111 R, 514, 515, 428; 426/106, 124, 118, 119, 410, 415, 392, 426/413, 316; 206/522, 204, 499, 505, 206/409; 502/400, 401
    See application file for complete search history.

(56) References Cited

U.S. PATENT DOCUMENTS

| | | | |
|---|---|---|---|
| 3,940,906 A * | 3/1976 | Leckband et al. | B65B 57/14 53/452 |
| 4,643,307 A * | 2/1987 | Wilkinson | B65D 85/20 206/443 |
| 4,827,698 A | 5/1989 | Banks | |
| 4,895,729 A * | 1/1990 | Powrie et al. | A23B 7/152 426/316 |
| 5,744,182 A * | 4/1998 | Andersson et al. | B65B 25/001 141/64 |
| 2002/0083730 A1 | 7/2002 | Giroux et al. | |
| 2004/0144063 A1* | 7/2004 | Countz | B65B 31/024 53/434 |
| 2004/0151812 A1* | 8/2004 | Bell | A23B 7/148 426/316 |
| 2005/0150434 A1 | 7/2005 | Wilson et al. | |
| 2005/0220716 A1 | 10/2005 | Cuney | |
| 2008/0008794 A1 | 1/2008 | Forsyth et al. | |
| 2009/0117236 A1 | 5/2009 | Watzke | |
| 2009/0242444 A1* | 10/2009 | Lebras | B65D 71/14 206/427 |
| 2009/0294916 A1 | 12/2009 | Ma et al. | |
| 2010/0047405 A1* | 2/2010 | Versteylen et al. | A47J 47/10 426/124 |
| 2010/0072104 A1* | 3/2010 | Kohl | B65B 61/02 206/531 |
| 2011/0253562 A1* | 10/2011 | Machado | B65D 81/28 206/213.1 |

OTHER PUBLICATIONS

"Dairy Products," accessed at http://web.archive.org/web/20140401081709/http://www.wipak.com/food/dairy/en_GB/lidding/, accessed on Oct. 31, 2014, p. 1.

"Activated carbon," accessed at https://web.archive.org/web/20151013213527/https://en.wikipedia.org/wiki/Activated_carbon, last modified on Oct. 9, 2015, pp. 11.

Ayala-Zavala, J.F., et al., "Natural antimicrobial agents incorporated in active packaging to preserve the quality of fresh fruits and vegetables," Stewart Postharvest Review, pp. 1-9 (May 2008).

International Search Report and written opinion for International Application No. PCT/US16/56508, dated Jan. 9, 2017, pp. 10.

* cited by examiner

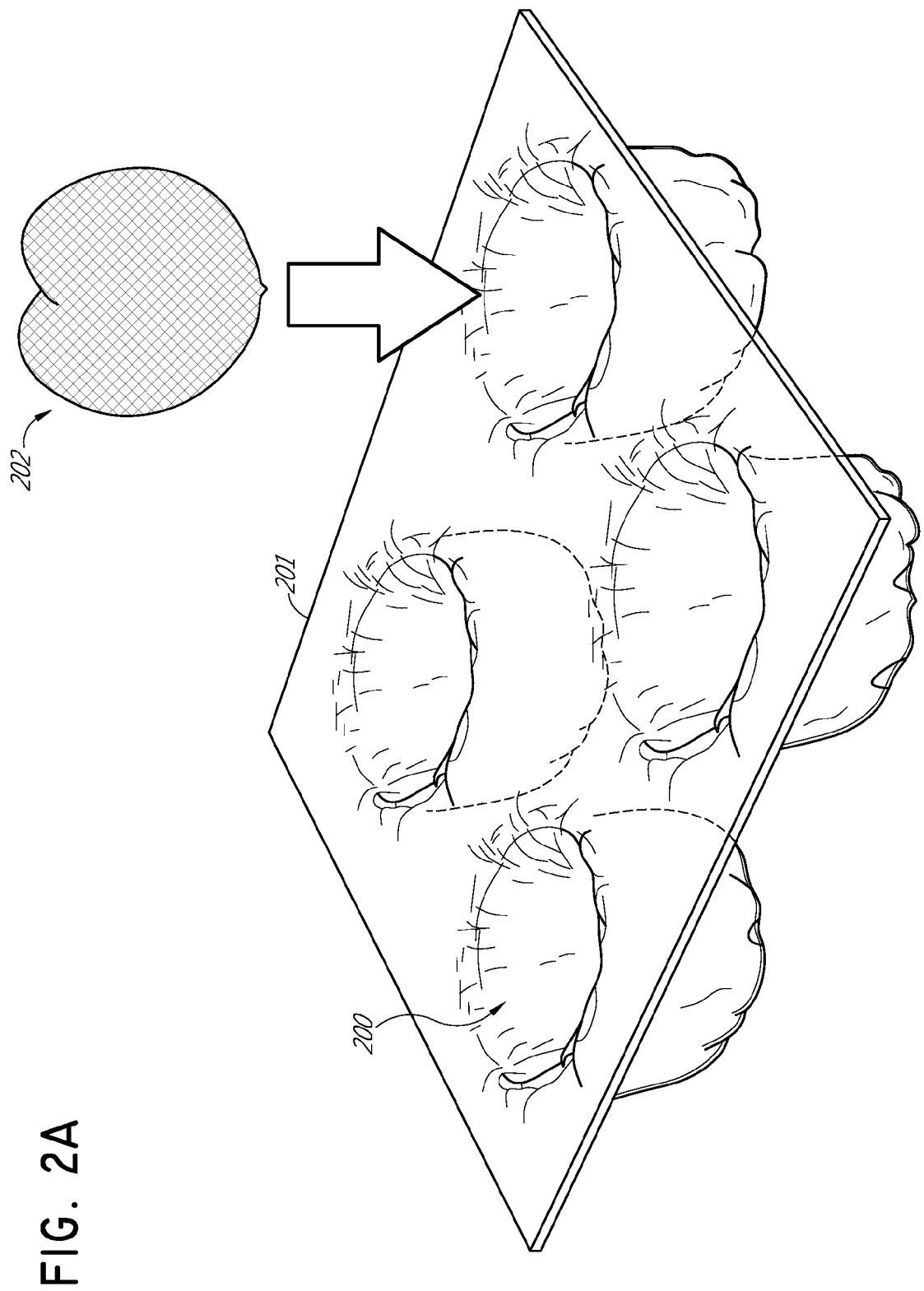

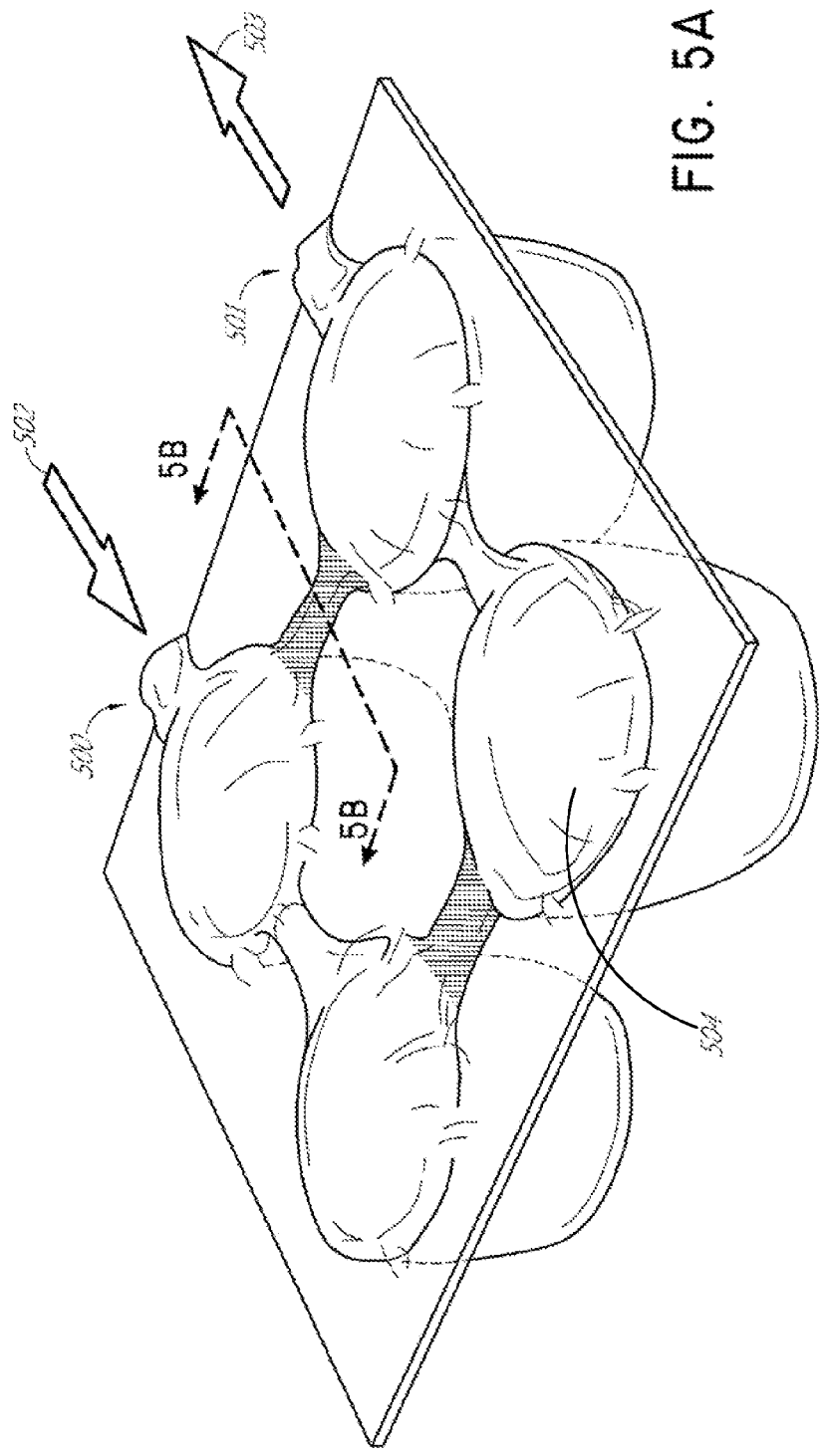
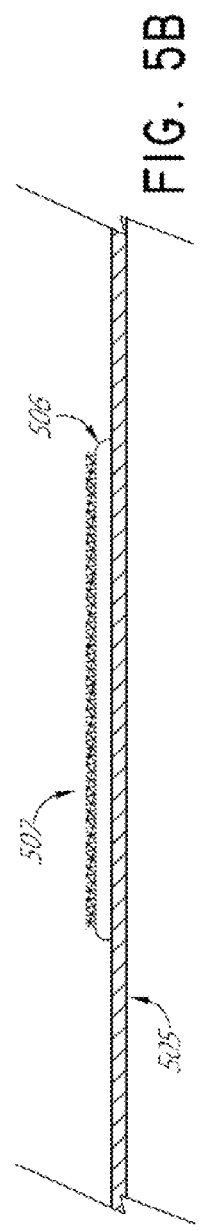
FIG. 5A
FIG. 5B

FRUIT IN A BUBBLE WRAP MAT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Improvements to post-harvest preservation of fruit is desirable as the handling of fruit during the transport from the farm to a commercial grocer can lead to damage to the fruit as well as early ripening due to the exposure of the fruit to ripening factors. One issue is that consumers may prefer fruit that has had minimum handling; by the farm, during packaging, at the point of sale presentation and by other consumers, ultimately reducing contamination and bruising. The more delicate and higher value the fruit, such as stone fruits, the more of a problem multiple handling becomes.

SUMMARY

In a first aspect, a package is disclosed for compartmentalized preservation of harvested fruit or vegetables. In some examples, the package comprises: a first flexible polymer film in the form of a flat sheet including cups, where each cup is configured to be expanded from a collapsed state disposed within the flat sheet to an expanded cup, having a depth and a circumference configured to accommodate the harvested fruit or vegetable; and a second flexible polymer film in the form of a flat sheet configured to overlay and partially adhere to the first polymer film, thereby covering the expanded cups; wherein at least one gas conduit is formed for each cup between the first and second polymer films.

In some embodiments, the first polymer film, or the second polymer film, or both include a polymer or composite polymer film selected from polypropylene, polyamide (nylon), polyvinyl, polyamide, polylactic acid (PLA), and polyethylene terephthalate (PET). In some examples, the first polymer film, or the second polymer film, or both, may comprise a gas impermeable metallized film (such as a metallized polymer, such as metallized PET) or a polymer laminate, such as a polyethylene terephthalate (PET) laminate. In some examples, the second polymer film comprises a polymer or composite polymer barrier film selected from polypropylene, polyamide, polyvinyl, polyamide, polylactic acid (PLA), or PET, and may comprise a gas impermeable metallized film, or polyethylene terephthalate (PET) laminate.

In some embodiments, each cup includes a small depression along with a bottom surface of the cup.

In some embodiments, the first polymer film or the second polymer film or both may be pre-spooled.

In some embodiments, the package further includes an adhesive disposed on the first or second polymer films, or both, in a pattern partially surrounding the cups, wherein the adhesive pattern is configured to create the at least one gas conduit between the first and second polymer films. The adhesive may be a binder gum selected from the group consisting of gum Arabic, guar gum, Acacia gum, tamarind gum, locust bean gum, and xyloglucan.

In some embodiments, the first polymer film and the second polymer film include aligned perforations, thereby allowing tearing off one or more individual sealed cups.

In some embodiments, the package further includes activated pads, which are in fluid communication with the cups, the gas conduits, or both. The activated pads may be gas-absorbing pads having one or more of activated carbon, a molecular sieve, a zeolite or calcium oxide. Alternatively or in addition, the activated pads may be moisture-absorbing pads including one or more of a molecular sieve, a zeolite, activated alumina, silica gel or montemorillomite clay.

In some embodiments, the cups are configured to be expanded by a pulse of compressed gas.

In some embodiments, at least one of the polymer films includes product data, such as a preprinted product logo or delivery information. Product data may be, for example, printed or otherwise formed or supported on a surface of the at least one polymer film. Product data may include price, pack date, use by date, trademark representations, product codes, geographical origin, nutrition data, packing process information such as product treatment, and the like.

In a second aspect, a method for packaging fruit or vegetables is disclosed. An example method includes: unspooling a first flexible polymer film in the form of a flat sheet having cups, where each cup is configured to be expanded from a collapsed state disposed within the flat sheet to an expanded cup, having a depth and a circumference configured to accommodate the fruit or vegetable; expanding the cup from its collapsed state cup disposed within the flat sheet to an expanded cup by a flow of compressed gas; placing the fruit or vegetable into the expanded cup; unspooling a second flexible polymer film; overlaying the first polymer film and the expanded cup holding the fruit or vegetable with the second polymer film; partially bonding the second polymer film to the first polymer film, such that at least one gas conduit is formed for each cup between the first and second polymer films allowing air to flow into each expanded cup; inflating the expanded cups by pumping a gas through the gas conduits, thereby forming inflated cups; and sealing the gas conduits, thereby sealing the fruit or vegetable within each inflated cup, thereby forming a sealed package.

In some embodiments, the method further comprises forming perforations between the sealed cups, thereby allowing tearing off one or more single sealed cups.

In some embodiments, the method further comprises positioning gas and/or moisture absorbing activated pads in fluid communication with at least some of the cups. The pads may be positioned within the at least one gas conduit and held in place using a binder gum or pectin, or the pads may be positioned within a depression along with a bottom or side surface of the expanded cups. The binder gum may be selected from the group consisting of gum Arabic, guar gum, Acacia gum, tamarind gum, locust bean gum, and xyloglucan.

The gas pumped through the gas conduits may comprise, consist essentially of, or may be: air, $CO_2$, $N_2$, hydrogen sulfide or steam, or a combination thereof. The gas may include hydrocarbon volatiles.

In some embodiments of the method, the fruit may be selected from the group consisting of bananas, apricots, mangoes, damsons, nectarines, peaches, apples, grapes, figs, kiwis, pears, tomatoes and plums.

In some embodiments, partial bonding may involve applying adhesive by hot glue melt or welding, or applying pressure and heat to the polymer films.

In some embodiments, pumping is performed using food grade pressurized bottled gas cylinders.

In some embodiments, sealing includes applying adhesive, heat and/or pressure to the package, thereby closing the gas conduits and forming an air tight seal.

In some embodiments of the method, placing the fruit or vegetable is performed using hopper machinery.

In some embodiments, the method may further include cutting the sealed package, thereby forming a sheet of sealed packages for layering. The method may also include layering the sheets of sealed packages into boxes or a retail display, such that a top layer of the sealed packages is overlaid on top of a bottom layer such that individual sealed cups of the top layer are placed in an orientation between the individual sealed cups of the bottom layer, thereby forming air gaps between the cups.

In a third aspect, a packaged fruit or vegetable product is disclosed. The packaged fruit or vegetable product may include: one or more individual pieces of fruit or vegetable, each compartmentalized within a sealed and inflated cup in a packing material. The packaging material includes: a first flexible polymer film comprising a plurality of expanded cups, each comprising a depth and a circumference configured to accommodate the individual piece of fruit or vegetable disposed therein; and a second flexible polymer film in a form of a flat sheet overlaying and partially adhering to the first polymer film, thereby covering the individual pieces of fruit or vegetable residing within each of the plurality of expanded cups. The packaged fruit product may be selected from a group consisting of bananas, apricots, mangoes, damsons, nectarines, peaches, apples, grapes, figs, kiwis, pears, tomatoes, and plums.

BRIEF DESCRIPTION OF THE DRAWINGS

FIGS. 2A and 2B show the placement of fruit into the cup of a polymer film and the addition of a top film for sealing the fruit, thereby creating a sealed cup. FIG. 2A shows cups and a fruit being placed in an expanded cup. FIG. 2B shows a second film being placed on the expanded cups filled with fruit

FIG. 4A shows the pads placed between the expanded (vacuum formed) cups. FIG. 4B shows the pads placed on the polymer film for sealing the package.

FIGS. 5A and 5B show the gas-absorbing pads in the gas conduits of the sealed fruit package.

DETAILED DESCRIPTION

Figure 1:
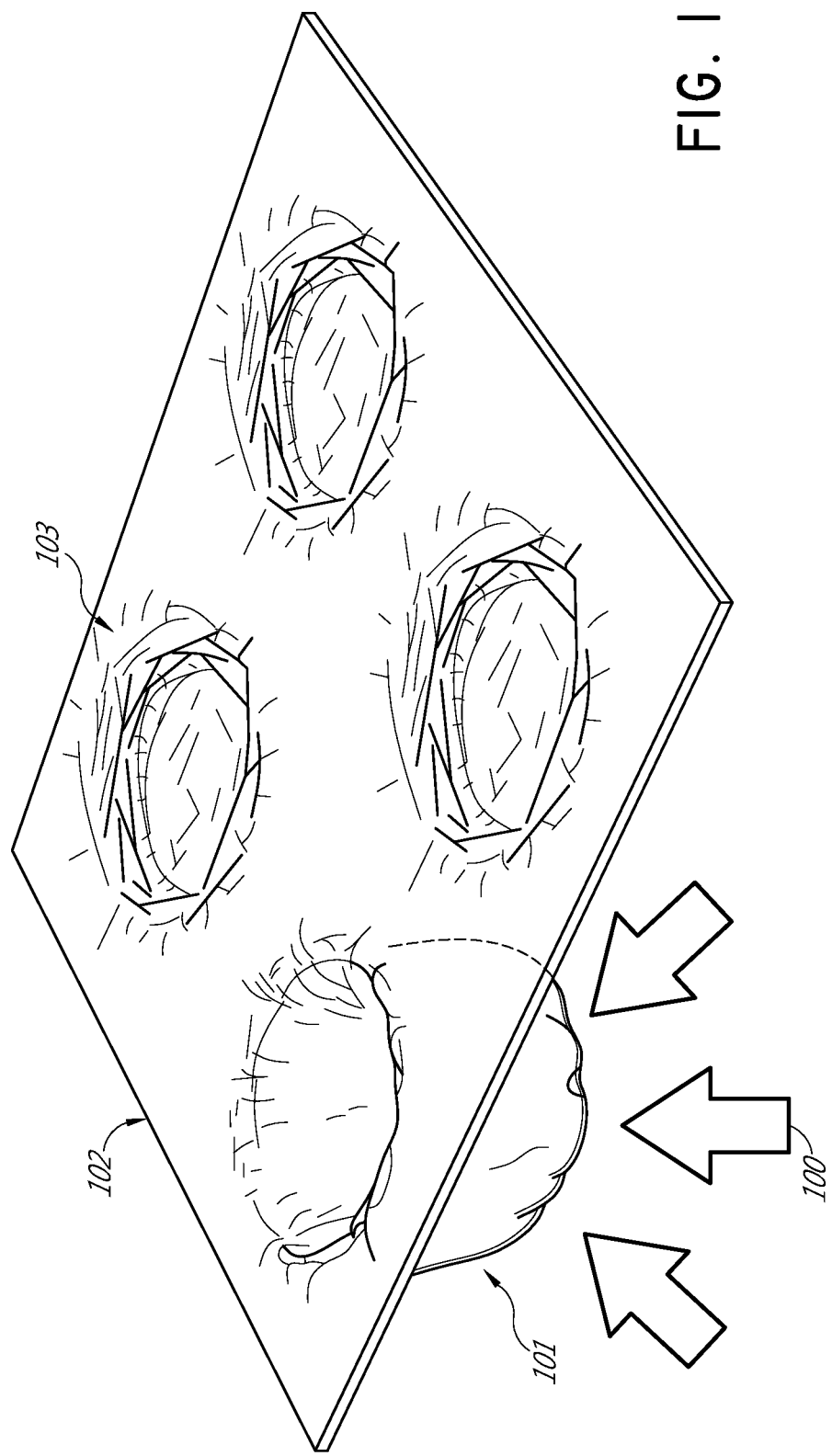
FIG. 1 shows a polymer film with an array of cups, wherein the cups are configured to be collapsed into the plane of the polymer film or expanded.

All patents, applications, published applications and other publications referred to herein are incorporated by reference for the referenced material and in their entireties. If a term or phrase is used herein in a way that is contrary to or otherwise inconsistent with a definition set forth in the patents, applications, published applications and other publications that are herein incorporated by reference, the use herein prevails over the definition that is incorporated herein by reference.

An effective oversized bubble wrap for sealing individual fruit so that the produce is kept sealed within each bubble is described. The bubble itself may be slightly pressurized to keep the skin of the bubble taut and hence protect the fruit from shock, vibration and any sudden temperature changes. The fruit filled bubbles also enable savings in material handling and waste at the point of sale/retail end of the products life.

As used herein, the singular forms "a", "an", and "the" include plural references unless indicated otherwise, expressly or by context.

Packaging is a technology of enclosing or protecting products for distribution, storage, sale, and use. Packaging may also include the process of design, evaluation, and production of packages. Packaging can be described as a coordinated system of preparing goods for transport, warehousing, logistics, sale, and end use. In some of the embodiments described herein, a package may contain, protect, preserve, transport, inform and can be used for selling a product. A package can refer to a plastic or polymer based package for preserving a good. In some embodiments, a package for compartmentalized preservation of harvested fruit or vegetables is provided. An example package can comprise a first flexible polymer film, comprising cups, wherein the cups are configured to be collapsed into a plane of the first polymer film or expanded, thereby forming collapsed or expanded cups, and a second flexible polymer film configured to overlay the first polymer film, thus forming a sealed cup. In some embodiments, the cups are molded or vacuum formed cups. In some embodiments, the cups are vacuum formed, hot air expanded, fluid expanded or 3-D printed. In some embodiments, the cups are expanded by a pulse of compressed gas, such as air.

In some examples, a package may comprise a polymer, which may be a large molecule, or macromolecule, composed of many repeated subunits. A polymer may comprise a synthetic plastic such as polystyrene. By way of example and not of limitation, a polymer can include polypropylene, polyamide (e.g. nylon), polyvinyl, polylactic acid (PLA), polystyrene, or a polyethylene (such as polyethylene terephthalate). A package may comprise a polymer in the form of a gas impermeable metallized polymer film (such as metallized PET) or a polymer laminate such as polyethylene terephthalate (PET) laminates.

In some embodiments, the first polymer film comprises a polymer or composite polymer film selected from polypropylene, polyamide (such as nylon), polyvinyl, polyamide, polylactic acid (PLA), gas impermeable metallized film (PET) or polyethylene terephthalate (PET) laminates, and wherein the second polymer film comprises a polymer or composite polymer barrier film selected from polypropylene, polyamide (nylon), polyvinyl, polyamide, polylactic acid (PLA) gas impermeable metallized film (PET) or polyethylene terephthalate (PET) laminates.

In some packages, the package may include an adhesive, which refers to any substance applied to the surfaces of materials that binds them together and resists separation. By way of example and not of limitation, adhesives may be a type of glue, cement, mucilage, or paste. In some embodiments, a package for compartmentalized preservation of harvested fruit or vegetables is provided. An example package can comprise a first flexible polymer film, comprising cups, wherein (in some examples) the cups are configured to be collapsed or expanded, thereby forming collapsed or expanded cups, in which the cups can be expanded by a pulse of compressed gas (such as air). An example package may comprise a second flexible polymer film configured to overlay the first polymer film, thus forming a sealed cup. In some embodiments, a package can further comprise an adhesive disposed around the cups, wherein the adhesive is configured to create gas conduits between the first polymer film and the second polymer film when the second polymer film is overlaid on top of the first polymer film, and wherein the adhesive is disposed such that for each cup there is at least a first gas conduit for inflowing air and a second gas conduit for outgoing air, and wherein the adhesive is disposed on the first polymer film or on the second polymer film.

In some methods of the embodiments described herein, a gas can be pumped into a package by a manual pump or a mechanical pump. By way of example and not of limitation, a gas may comprise air, nitrogen, an inert gas (such as argon), carbon dioxide ($CO_2$), a hydrocarbon volatile, such as ethylene, or a combination thereof.

A package may further comprise a second flexible polymer film configured to overlay the first polymer film, thereby forming sealed cups. In some embodiments, the package can further comprise an adhesive disposed around the cups. In some examples, the adhesive may be configured to create or otherwise provide gas conduits between the first polymer film and the second polymer film when the second polymer film is overlaid on top of the first polymer film, and wherein the adhesive is disposed such that for each cup there is at least a first gas conduit for inflowing air and a second gas conduit for outgoing air, and wherein the adhesive is disposed on the first polymer film or on the second polymer film. In some embodiments, the gas comprises hydrocarbon volatiles. In some embodiments, the gas comprises air, $CO_2$, $N_2$, and/or steam.

In example packages described herein, a package can have perforations in the first and second polymer film that allow tearing off of an individual pocket, such as a sealed pocket including a piece of fruit. A perforation may refer to one or more small holes, for example, formed in a sheet, such as in a thin material or web. There may be more than one perforation in an arrangement, such as a linear array. An arrangement of the holes may be called a perforation.

In some embodiments, a package for compartmentalized preservation of harvested fruit or vegetables is provided. An example package can comprise a first flexible polymer film, comprising cups, wherein the cups are configured to be collapsed or expanded, thereby forming collapsed or expanded cups, and a second flexible polymer film configured to overlay the first polymer film, thus forming a sealed cup. In some embodiments, the first polymer film and the second polymer film comprise perforations, wherein the perforations are between the cups on the first polymer film, and wherein the second polymer film comprises perforations that align with the perforations of the first polymer film when the second polymer film is overlaid on top of the first polymer film, thereby allowing tearing off of a single sealed cup. In some embodiments, the cups are configured to be collapsed or expanded, thereby forming collapsed or expanded cups, in which the cups can be expanded by a pulse of compressed gas (such as air).

In some embodiments of the packages described herein, the materials for the package may be considered as food grade products. Food grade products refer to a product that has been approved for use with food by a standard regulatory system, such as for example, the Food and Drug Administration (FDA) in the US, or an equivalent body.

In some embodiments, a package for compartmentalized preservation of harvested fruit or vegetables is provided. An example package can comprise a first flexible polymer film, comprising cups, wherein the cups are configured to be collapsed or expanded, thereby forming collapsed or expanded cups, and a second flexible polymer film configured to overlay the first polymer film, thereby forming a sealed cup. In some embodiments, a package may further comprise one or more pads, wherein the pads are positioned between the cups within at least one of the gas conduits, and wherein the one or more pads are disposed along the first polymer film or disposed along the second polymer film. In some embodiments, the one or more pads or are configured for absorbing gas and/or moisture. In some embodiments, the package may comprise sealed packets comprising desiccants and/or gas absorbents. In some embodiments, a package may further comprise a moisture absorber, gas absorber, and the like, which may be in the form of a pad, such as a moisture absorbing pad or a gas-absorbing pad. In some embodiments, a package further comprises a packet comprising anti-ripening agents, anti-microbial agents, or other anti-pathogen components.

In order to preserve the integrity of the fruit or vegetables, anti-ripening agents may be added to the packages. In some embodiments, the anti-ripening agents can be provided within packets that are porous. Ripening agents may comprise substances which can hasten the ripening process of fruits and/or vegetables. Ripening agents can include, but are not limited to ethylene, ethylene glycol, ethephion, and ethrel. These ripening agents, such as, for example, ethylene, can expedite the ripening of fruit. In some embodiments of the package, the package further comprises anti-ripening agents such as hydrogen sulfide or materials that absorb or remove ripening agents, such as, for example ethylene.

Anti-microbial agents may comprise a drug, chemical or a substance that can kill or inhibit the growth of microbes. Microbial decay can compromise the quality of fresh produce. Therefore, post-harvest treatment can reduce the growth of microbes in fruit and/or vegetables. As fruits and vegetables can contain a good source of nutrients for bacteria, yeast and mold, an anti-microbial agent may be used, for example applied to the fruit, applied to an interior surface of a pocket, introduced into a fluid enclosed by the pocket, or otherwise introduced to an interior of a pocket, as appropriate. An anti-microbial agent may comprise a natural anti-microbial agent. Natural anti-microbial agents can include but are not limited to *Rheum palmatum* extract, *Coptis chinensis* extract, Ag-substituted inorganic zirconium matrix, silver zeolites, bacitracin, peptides, enzymes, polyamines, organic acids, chitosan, calcium alginate, and calcium gluconate. As described in Ayala-Zavala et at ("Natural antimicrobial agents incorporated in active packaging to preserve the quality of fresh fruits and vegetables," Stewart Postharvest Solutions, Jun. 1, 2008; incorporated by reference in its entirety herein), natural antimicrobial agents can be placed within a packet, in which the natural antimicrobial agent can actively diffuse in-package to prevent the growth of microorganisms. In some embodiments of the package, the package can further comprise a packet comprising natural anti-microbial agents. In some embodiments, the natural anti-microbial agents comprise *Rheum palmatum* extract, *Coptis chinensis* extract, Ag-substituted inorganic zirconium matrix, silver zeolites, bacitracin, peptides, enzymes, polyamines, organic acids, chitosan, calcium alginate, or calcium gluconate.

In some embodiments, a package may further comprise a moisture absorber, gas absorber, and the like, which may be in the form of a packet. In some embodiments, the moisture-absorber or gas-absorber is in the form of a packet containing the moisture absorber or gas-absorber. In some embodiments, the moisture-absorber or gas-absorber is a food grade element. In some embodiments, the moisture-absorbing pad or gas-absorbing pad comprises food grade elements. For example, a package may comprise one or more pads, packets or other elements, wherein the one or more pads, packets or elements are configured for absorbing gas or moisture, wherein the pads are positioned between the cups within at least one of the gas conduits, and wherein the one or more pads are disposed along the first polymer film or disposed along the second polymer film. In some examples, the one or more pads may be bound to the first polymer film and/or second polymer film, for example by binder gum or pectin, or the pads may positioned on a support structure on the depression at a bottom or sides of the cups such that the pads are facing the first or second polymer film, or wherein the support structure is disposed on top of the first polymer film such that the support structure is on top of the cups. In some embodiments, ingoing and outgoing air in the gas conduits comprise $CO_2$, $N_2$ and/or steam.

In some embodiments, a method for packaging fruits and vegetables is provided. The method can have the following steps: unspooling a first flexible polymer film, comprising a cup, wherein the cups are configured to be collapsed or expanded, in which the cups can be expanded by a pulse of compressed gas (such as air), wherein upon expansion, the expanded cup is configured to hold a fruit or vegetable, placing the fruit or vegetable into the expanded cup, unspooling a second flexible polymer film, overlaying the first polymer film and the expanded cup holding the fruit or vegetable with the second polymer film, partially bonding the second polymer film to the first polymer film, such that at least one gas conduit is formed for each cup between the first and second polymer films allowing air to flow into each expanded cup, inflating the expanded cups by pumping a gas through the gas conduits, thereby forming inflated cups and sealing the gas conduits, thereby sealing the fruit or vegetable within each inflated cup, thereby forming a sealed cup and sealed package. In some embodiments, the gas comprises air, $CO_2$, $N_2$, hydrogen sulfide, and/or steam.

In some embodiments, the gas comprises steam. In some embodiments, the first polymer film and the second polymer film comprises polyamides, polypropylene, or heat resistant polylactic acid. In some embodiments, the fruit or vegetable is cooked, blanched or sterilized within the cup. Steam can be formed at a temperature in which water is boiled at 100° C. However, at lower pressures, steam can be formed at a lower temperature. Depending on the length of time that a gas comprising steam is pumped into the package and the size of the fruit, the fruit may be cooked, blanched or sterilized within the cup. There are several types of polymers that can withstand heat, for example, polypropylene can withstand heat in an autoclave. Polyamides have properties to withstand temperatures as high as 452° C. and have a very good heat resistance. Polyvinyl has poor heat stability. Heat resistant polylactic acid can withstand temperatures of 110° C.

In some examples, a support structure may comprise a rigid element such as a ring structure or a rigid structure that is compatible to fit in the cup of the package on the depression at a bottom or sides of the cups, or on the top of the first polymer film such that the support structure is on top of the cups. In some embodiments, the support structure can be used to position or align the gas-absorbing or moisture-absorbing pads within the cups. In some embodiments, the support structure is a rigid structure designed to fit within the depression of the cups or designed to fit the circumference of the cup when the support structure is disposed on top of the first polymer film such that the support structure is on top of the cups. In some embodiments, the support structure is a ring structure. In some embodiments the support structure comprises plastic.

In some embodiments of the packages, the packages include pads, wherein the pads are gas-absorbing pads comprising (e.g. containing) activated carbon for the absorption of gases. The activated carbon is a form of carbon processed to have small, low-volume pores that increase the surface area available for adsorption or chemical reactions. The activated carbon is highly porous and can be used to bind to impurities such as carbon based impurities.

In some embodiments of the package, the package further comprises pads, wherein example pads include moisture-absorbing pads and/or gas absorbing pads. In some embodiments, the pads comprise a zeolite. A zeolite may comprise an aluminosilicate, such as a hydrated aluminosilicate, wherein the hydrated aluminosilicate can comprise sodium, potassium, calcium, barium, or an aluminum alkali metal aluminosilicate. A zeolite may be in the form of a granulated material, porous film, clay-like material, and the like. A zeolite can be a natural zeolite or synthetically made zeolite, and can be used as an adsorbent. In some embodiments, packages may comprise pads comprising a zeolite as an adsorbent. In some examples, zeolites can be in the form of zeolite clay. In some examples, a synthetic zeolite may be used. Without being limiting, examples of zeolites include analcime, chabazite, natrolite, phillipsite, gonnardite, mesolite, paranatrolite, scolecite, tetranatrolite, edingtonite, kalborsite, leucite, pollucite, wairakite, laumontite, yugawaralite, goosecreekite, montesommaite, harmotome, amicite, gismondine, garronite, gobbinsite, boggsite, merlinoite, mazzites, paulingites, perlialites, chabazite, herschelite, willhendersonite, SSZ-13, faujasites, Linde type X zeolites, Linde type Y zeolites, maricopaite, mordenites, offretite, wenkite, bellbergite, bikataite, eroinites, ferrierites, gmelinites, levynes, dachiardites, clinoptilolite, heulandites, epistilbites, arrerite, stellerite, brewsterites, cowlestites, pentasils, tschemichite, Linde type A zeolites, and stilbites. The use of zeolites can include but is not limited to the separation and removal of gases such as $H_2O$, $CO_2$, $SO_2$, ethylene and noble gases. In some embodiments, a zeolite is selected from a group consisting of analcime, chabazite, natrolite, phillipsite, gonnardite, mesolite, paranatrolite, scolecite, tetranatrolite, edingtonite, kalborsite, leucite, pollucite, wairakite, laumontite, yugawaralite, goosecreekite, montesommaite, harmotome, amicite, gismondine, garronite, gobbinsite, boggsite, merlinoite, mazzites, paulingites, perlialites, chabazite, herschelite, willhendersonite, SSZ-13, faujasites, Linde type X zeolites, Linde type Y zeolites, maricopaite, mordenites, offretite, wenkite, bellbergite, bikataite, eroinites, ferrierites, gmelinites, levynes, dachiardites, clinoptilolite, heulandites, epistilbites, arrerite, stellerite, brewsterites, cowlestites, pentasils, tschemichite, Linde type A zeolites or stilbites. The use of zeolites can be the absorption of water from humidity.

In some embodiments of the package, the package comprises pads, wherein the pads are moisture absorbing pads. In some embodiments of the package, the pads are moisture absorbing pads, wherein the moisture absorbing pads comprise a desiccant. In the embodiments described herein, the pads comprise food grade desiccants. The desiccants are hygroscopic substances that can be used a drying agent or a moisture absorbing agent within the pads. An example desiccant is activated alumina, which may be prepared as a porous material by dihydroxylation of aluminum hydroxide.

In some embodiments, the package comprises pads, wherein the pads are moisture-absorbing pads. In some embodiments, the moisture absorbing pads comprise silica, such as silica gel. The silica (for example, in the form of a silica gel) may be in the form of a solid water insoluble desiccant. Silica, such as silica gel, can be used to control humidity in a local or microenvironment such as within a package, and as such can prevent or slow down the spoilage or degradation of food products such as fruits and vegetables.

A molecular sieve refers to a material that is a manufactured crystalline version of zeolite that contains a network of uniformly sized pores comprising empty cavities. Examples can include but are not limited to porous glass that have pores that range in size from 1 nm to 50 nm, for example, and clays. Examples of clay can include halloysite, which occurs naturally. Sodium aluminosilicate can be used with consumable food products. In some embodiments of the package described herein, the package comprises pads, wherein the pads are moisture-absorbing pads. In some embodiments, the moisture absorbing pads comprise an aluminosilicate, such as an alkali metal aluminosilicate, such as sodium aluminosilicate. In some embodiments of the package, the package comprises pads, wherein the pads are gas-absorbing pads. In some embodiments, the gas-absorbing pads comprise a molecular sieve.

In some embodiments of the package, the package comprises gas-absorbing pads or gas-absorbing packets. In some embodiments, the gas-absorbing pads comprise calcium oxide. In some embodiments, the gas absorbing packets comprise calcium oxide. Calcium oxide is a white, caustic, alkaline, crystalline solid at room temperature. In some embodiments of the package, a packet or pad comprising calcium oxide is provided for gas absorption. In some embodiments, the calcium oxide is in a powdered form. Calcium oxide can be used in gas absorption, as calcium oxide absorbs, for example, carbon dioxide.

In some embodiments, the package can further comprise pads, wherein the pads absorb moisture or gases. In some embodiments, the pads are gas-absorbing pads or moisture absorbing pads, wherein the pads are food grade. In some embodiments, the pads are moisture absorbing pads, wherein the moisture-absorbing pads comprise a desiccant. In some embodiments, the desiccant is a food-grade desiccant. In some embodiments, the gas-absorbing pads comprise food-grade material. In some embodiments, the desiccant comprises a zeolite, silica gel, a molecular sieve, calcium oxide, calcium chloride, or clay such as montemorillonite clay. In some embodiments, the pad is a gas-absorbing pad. In some embodiments wherein the pads are gas-absorbing pads, the gas-absorbing pads comprise activated carbon or calcium oxide, wherein the pads are positioned between the cups within at least one of the gas conduits, and wherein the pads are disposed along the first polymer film or disposed along the second polymer film, wherein the pads are bound to the first polymer film or second polymer film by binder gum or pectin, or the pads are positioned on a structural support on the depression at a bottom or sides of cups such that the pads are facing the first or second polymer film, or wherein the structural support is disposed on top of the first polymer film such that the plastic ring is on top of the cups. In some embodiments, the binder gum is selected from a group comprising gum Arabic, guar gum, Acacia gum, tamarind gum, locust bean gum, or xyloglucan. In the embodiments, the binder gum is a natural gum, used as an adhesive. Examples of binder gum can include gum Arabic, guar gum, Acacia gum, tamarind gum, locust bean gum, or xyloglucan. In some examples, a synthetic gum may be used. In some examples, any suitable adhesive may be used in place of a binder gum as described in examples.

A calcium aluminum silicate of hydrous clay is a naturally occurring non-hazardous material that can be used for humidity control. It is also referred to as montemorillonite clay. In some embodiments of the package described herein, the package comprises pads, wherein the pads are moisture-absorbing pads. In some embodiments, the moisture absorbing pads comprise clay, such as montemorillonite clay.

In some embodiments a package is provided for fruit or vegetables. Fruits can include a part of a flowering plant that derives from specific tissues of the flower, one or more ovaries, and in some cases accessory tissues. Examples of fruit can include bananas, apricots, mangoes, damsons, nectarines, peaches, apples, grapes, figs, kiwis, pears, tomatoes and plums. These examples are non-limiting. In some embodiments, a package is provided for fruit or vegetables. In some embodiments, the fruit is selected from a group comprising bananas, apricots, mangoes, damsons, nectarines, peaches, apples, grapes, figs, kiwis, pears, tomatoes and plums. In some examples, a package is provided for vegetables.

Vegetables can include edible plants or its parts, intended for cooking or eating raw. Without being limiting, examples of vegetables can include broccoli, cauliflower, globe artichokes, leeks, Brussels sprouts, celery, asparagus, tubers, carrots, beets, radishes, onions, and turnips. In some embodiments, a package is provided for fruit or vegetables. In some embodiments, the vegetables are selected from a group comprising broccoli, cauliflower, globe artichokes, leeks, brussel sprouts, celery, asparagus, tubers, carrots, beets, radishes, onions, and turnips.

In some embodiments a method is provided, wherein a hopper is used for placing fruit into a package. In some examples, a hopper can be provided by a machine for placing fruit into a package.

Packages for Fruit and/or Vegetables

The delivery of fruit or vegetables fresh from the farm to the consumer presents several challenges, some or all of which may be addressed by examples described herein. In some examples, packaging apparatus and methods are described, which may be used e.g. on the farm, and may not require a lot of capital investment or manual material handling.

In some examples, a package is provided for a plant material, such as a mushroom, herb, bulb, corn, non-edible or edible tuber, seed, and the like.

In some examples, package elements for bubble wrap may be provided 'pre-spooled', allowing packaging with minimal capital cost. Accordingly, in some embodiments, a package for fruit or vegetables is provided, wherein the package is pre-spooled.

A challenge in delivering farm fresh fruit or vegetables to consumers is to maintain the packaged fruit in a fresh and unbruised state during transportation and presentation in markets. In some examples, a fruit or vegetable may be individually placed into (optionally expandable) cups in a flexible polymer sheet, the cups being sized to accommodate the fruit or vegetable. The cups with fruit or vegetable are then covered with a second flexible polymer sheet, which is bonded to (using e.g. adhesive or heat welding, etc.) the first, thereby forming a sealed cup and a sealed package. An air passage or conduit can be left open between the two polymer layers, such that a gas can be infused into the cup thereby inflating the cup. The gas conduit may be sealed to create an air/gas-filled pillow that acts to maintain the packaged fruit in a fresh and unbruised state.

FIG. 1 shows a roughly square piece of soft flexible film that features four cups. As shown in FIG. 1, three of the cups have been collapsed into flattened cups 103 by a collapsing force 100. This square represents only a segment of a continuous strip of film. The cupped film can be re-spooled onto a drum if the cups are collapsed back into the plane of the film by some force 100. This film spool, along with a lid film spool can be easily transported to the farm or orchard. Example cup dimensions and shapes are not particularly limiting, and dimensions and shapes may vary depending on the size and type of fruit or vegetable that the cup is intended to accommodate. FIG. 1, shows the polymer film 102, the flattened cups 103, and an expanded cup 101. Collapsing forces 100 are used to collapse the cups into the plane of the polymer film 102.

Figure 2B:
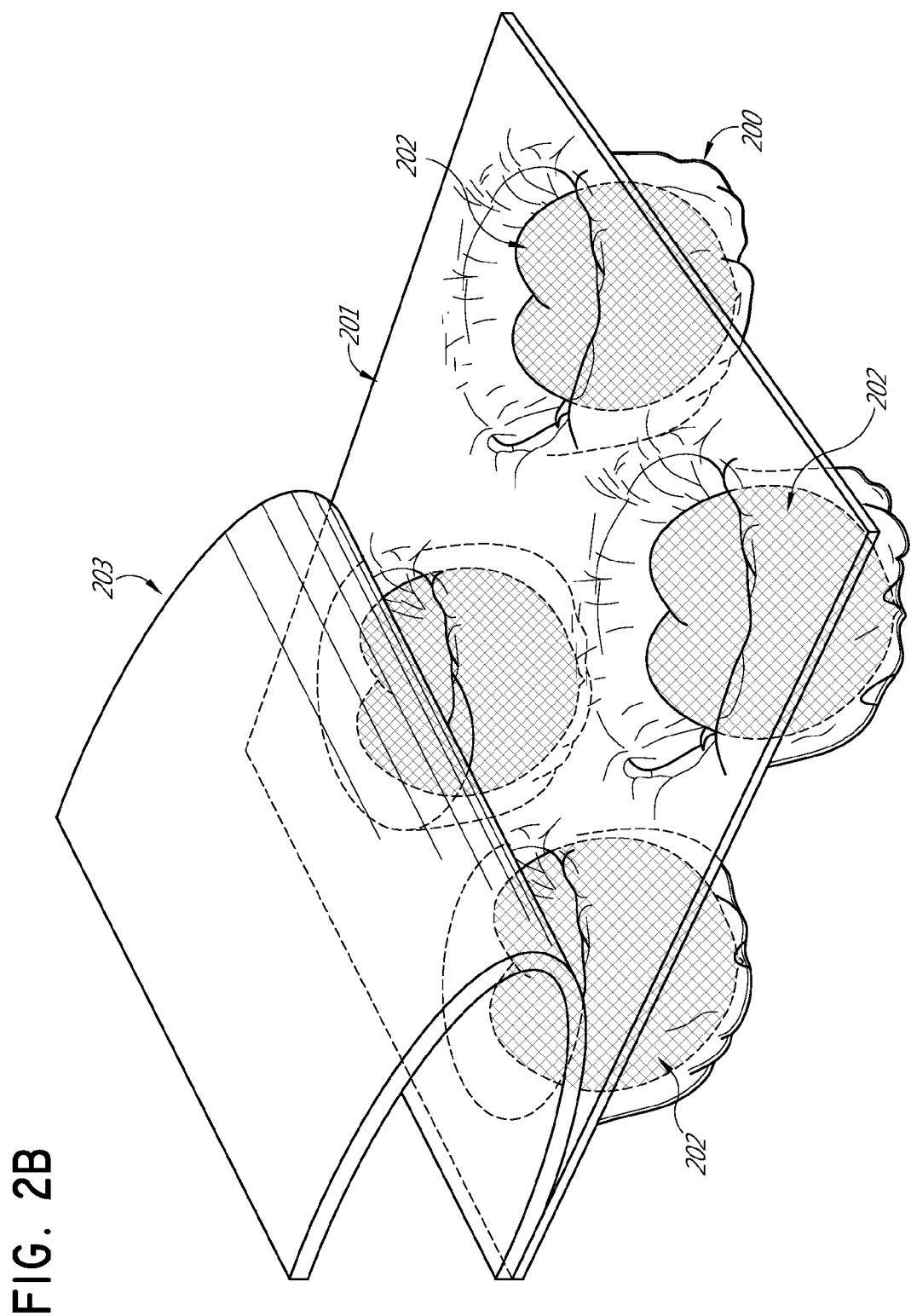

Once on the farm, machinery such as a hopper can un-wind the film strip and the collapsed cups or flattened cups 103 may be expanded into expanded cups 101 or re-formed, e.g., with a pulse of compressed air or a piston. In some examples, the fruit (such as, for example, apricots) is placed into each cup. This may be achieved by rolling each piece of fruit or vegetable into an individual cup. In some embodiments, the fruit or vegetable may be washed. In some embodiments, the fruit or vegetable may be pre-cooled (e.g., by the washing water or other known refrigeration process, such as in a cooled room). The fruit or vegetable may be rolled off a shallow hopper that then falls into its own cup as shown in FIGS. 2A and 2B. In some embodiments, a method of packaging fruit is provided, wherein the packaging is performed by a hopper. In some embodiments, the fruit or vegetable is hand placed into the cups. FIG. 2A shows the vacuum formed cup 200 of the polymer film 201, and the fruit 202 being placed into the cup 200. FIG. 2B shows the package being sealed. As shown in FIG. 2B, the fruit 202 in the cup 200 of the polymer film 201. The top seal, which is a second polymer film 203, is placed over the polymer film 201, which has an adhesive placed upon it to allow the sealing. The second polymer film 203 is used to cover, seal or cap off the open cups. The second polymer film may be bonded to the first polymer film 201, e.g., by adhesive bonding, hot melt glue bonding, or welded together (FIG. 2B). This top film may have the product data such as a logo, livery, or other information etc. preprinted on it, or printed on a label supported by the top film. If adhesive is used, then it can be added during assembly on the farm but would be easier if either the top lid or bottom cup plane had adhesive already in place prepared by the film supplier. The adhesive or weld may be patterned to create gas conduits formed between the layers. In some embodiments, a package is provided for the packaging of fruit or vegetables, wherein the package further comprises adhesives. In some embodiments, the first or second polymer film comprises a product logo, livery and/or information.

Figure 3:
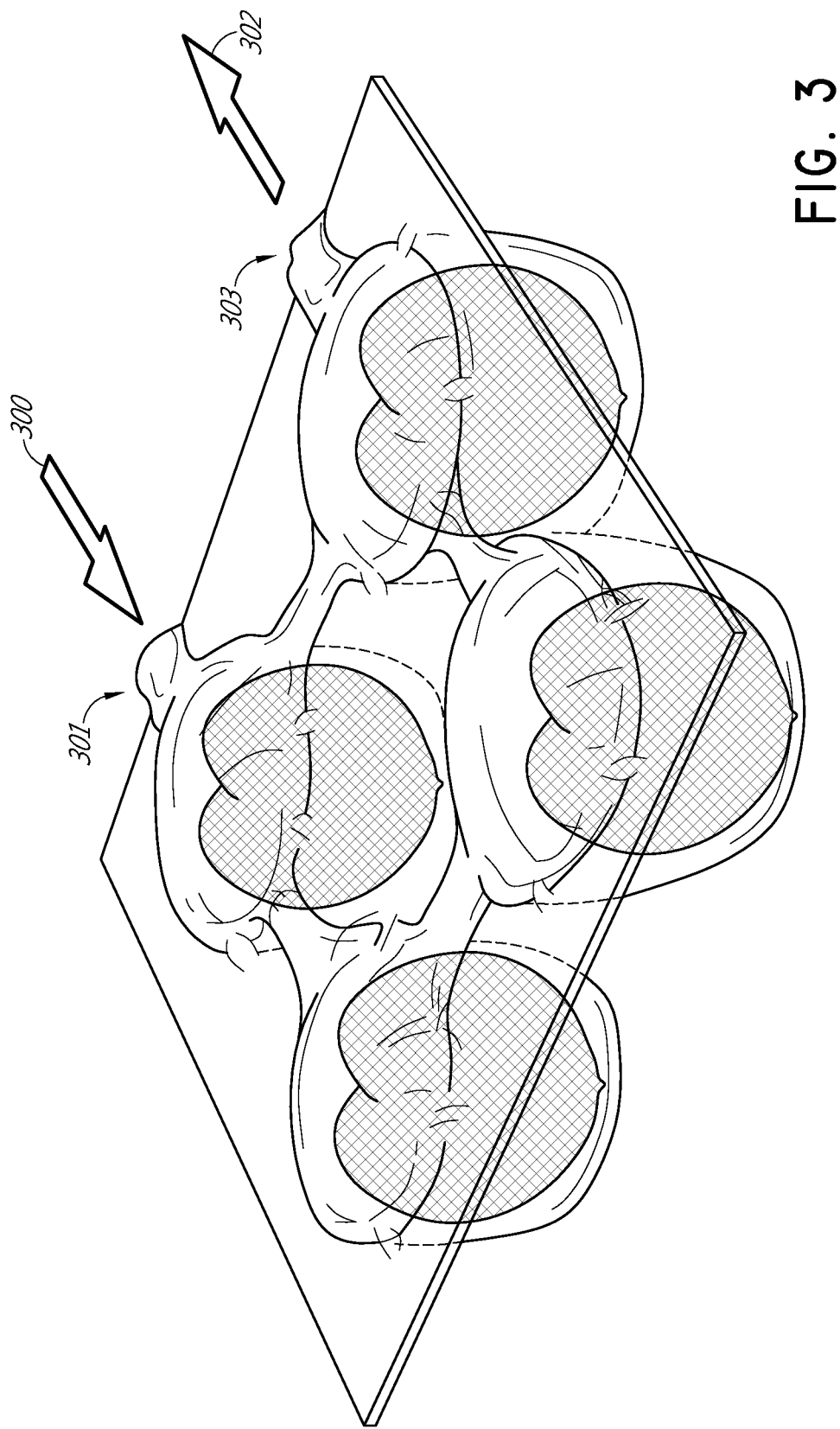
FIG. 3 shows the gas conduits for incoming gas and outgoing gas once the fruit is sealed into expanded cups.

After the top lid is added then the package may be inflated to make the film membrane taut and give the package rigidity (FIG. 3). As gas enters the package 300, into the inlet port 301, purged air 302 can be displaced via an exit port 303, which may be sealed just before pressurization. The pressurized gas may help give structure to the package, and help protect contents within the pocket. The total amount of plastic may be reduced, compared to a rigid tray, by using a flexible thin film.

FIG. 3 also shows that conduits exit between cavities where adhesive has been masked off so that only a few gas injection ports are needed. After inflation, all port holes and conduits can be sealed off by adhesive and/or welding. The inflating stage is where various gas types, such as air, $CO_2$, $N_2$ and steam can be used to extend the fruits storage life. As shown in FIG. 3, the gas is going into the inlet conduit 301 and the gas is going out of the outlet conduit 303.

Figure 4A:
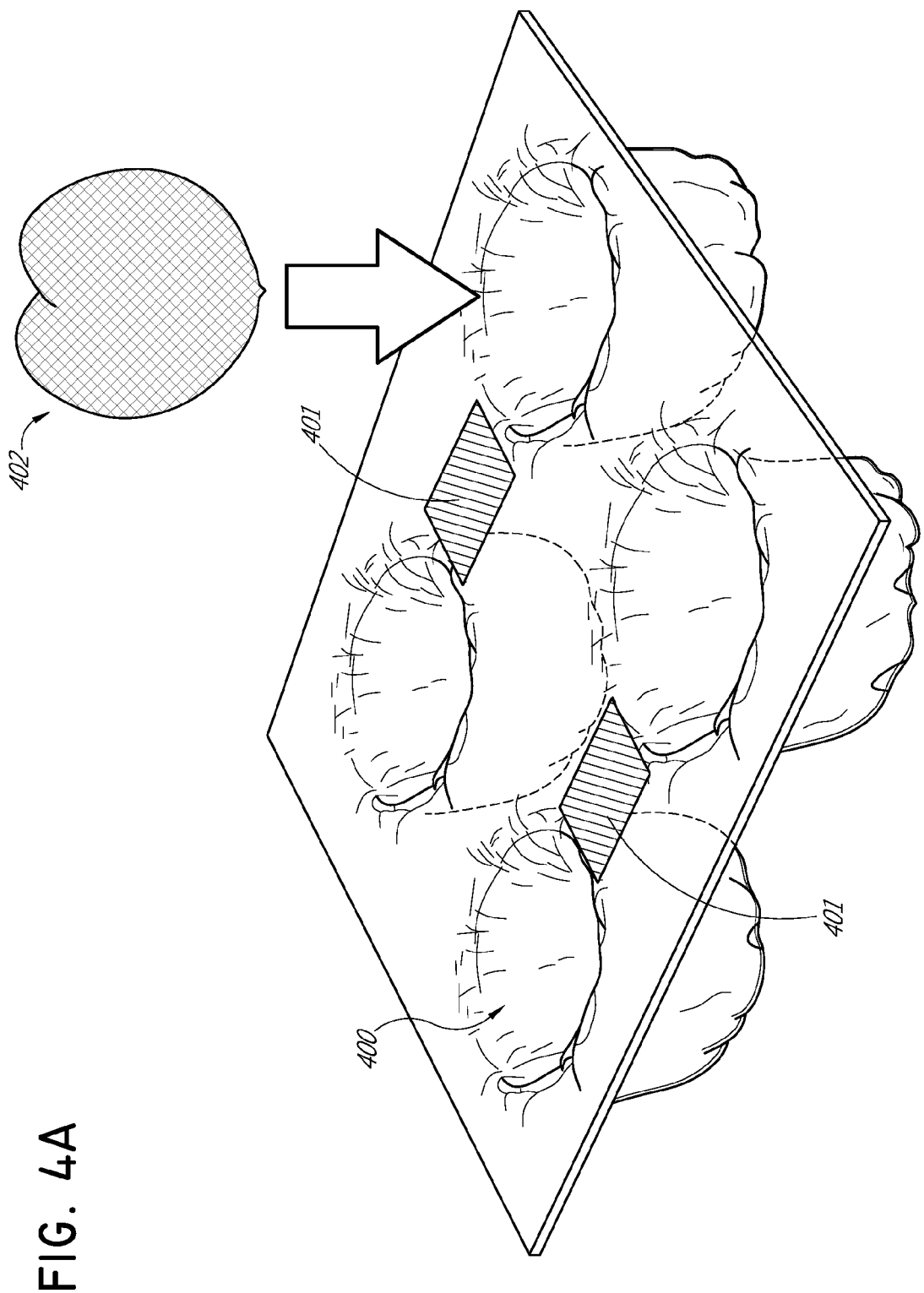
FIGS. 4A and 4B show the gas-absorbing pads that are placed in the gas conduits of the polymer film.
Figure 4B:
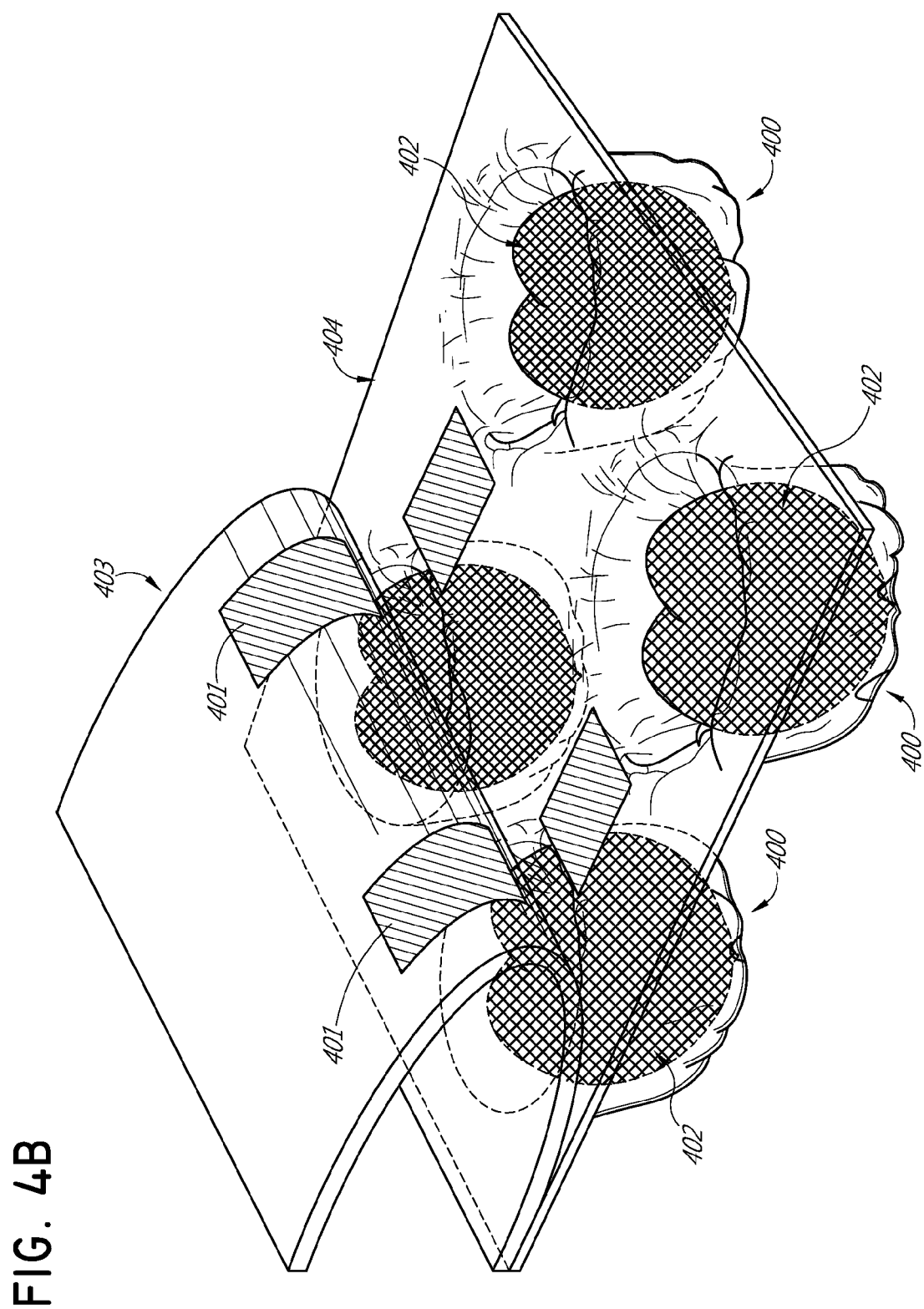

As shown in FIG. 4, the package can also further comprise one or more activated pads for absorbing gas and/or moisture. Such activated pads may comprise one or a combination of compositions that absorb gas and/or moisture. For example, gas-absorbing pads may comprise activated carbon. Alternatively, the gas-absorbing pads may comprise a zeolite, calcium oxide, or a molecular sieve composition instead of or together with activated carbon. Moisture-absorbing pads can comprise one or more desiccants described herein, and may also include in some embodiments a gas-absorbing material described herein. As shown in FIG. 4A, are the vacuum formed cups 400, the pads 401 and the fruit 402. FIG. 4B shows the fruit being sealed in the packaging. As shown is the fruit 402 in their vacuum formed cups 400, with a top film 403 for sealing the fruit. The pads 401 may be gas-absorbing or moisture absorbing pads and can be placed on either the top film 403, or the polymer film 404 comprising the cups 400. An adhesive may be placed in between the cups along the polymer film 404 or on the top film 403.

As illustrated in FIGS. 5A and 5B, the pad comprising activated carbon can reside in the gas conduits. As shown in the cross section of the pad comprising activated carbon (FIG. 5B), the pad comprising activated carbon can be placed onto the film by a binder gum. Alternatively, the pads can be placed along the first polymer film or disposed along the second polymer film, wherein the activated gas-absorbing pads are bound to the first polymer film or second polymer film by binder gum or pectin, or the gas-absorbing pads are positioned on a structural support on depression at a bottom or sides of cups such that the pads are facing the first or second polymer film, or the support structure comprising the pad is disposed on top of the first polymer film such that the plastic ring is on top of the cups. The gas-absorbing pads may be placed such that there is no direct contact with the skin of the fruit. The pads may also be placed so as to also not interfere with branding or livery.

In FIG. 5A, as shown in the overview of the inlet 500 and outlet 501 formed by the weld/adhesive seal of the package and the conduit in between the cups 504. During packaging, the final steps include purging gas 502 into the inlet 500 while gas goes out 503 the outlet 501. As shown in FIG. 5B, the cross section of the polymer film at the gas conduit between the cups 504. In FIG. 5B, overlaying the polymer film 505, is the gum 506 which adheres the pad containing the activated carbon particles 507 to the polymer film 505.

Figure 6:
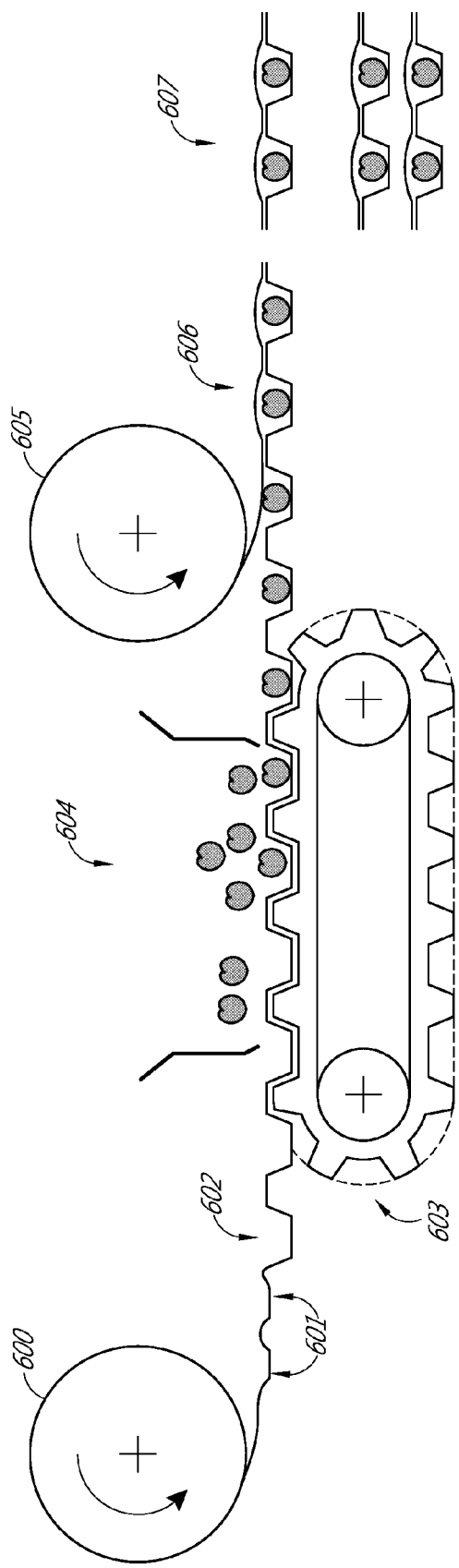
FIG. 6 shows a method of placing fruit into the fruit package by a hopper.

As shown in FIG. 6, the fruit can be placed into the package by a method using hopper machinery. FIG. 6 illustrates the packaging process featuring the two spools of film and the shallow (single layer) fruit hopper. The plant only needs one main electrical motor since pulling the two strips of film towards the right hand side of the picture simultaneously unspools both drums and allows the fruit to fall naturally into the cups as the lower film passes under the hopper. The cups under the hopper are supported by a flexible belt that has the shape of the cups molded into it. On site, pneumatic air jets may serve to deploy the cups and food grade bottled gas cylinders can be used to inflate the package. The air jet can come from a manual or a mechanical device. In some embodiments, a method of packaging is provided wherein a cutter/guillotine can be used to separate the package into bubble wrap mats that are then layered into boxes. As shown in FIG. 6, rotating spool 600 causes unspooling of the first flexible polymer film with collapsed cups 601. The collapsed cups 601 are expanded by an air jet (not illustrated) to form expanded cups 602. The expanded cups 602 are conveyed by drive belt 603 to a shallow hopper 604. As illustrated, the drive belt 603 may be configured to flexibly accommodate the expanded cups 602. Fruit or vegetables in the hopper 604 fall into the open expanded cups 602. Rotation of spool 605 causes unspooling of the second flexible polymer film (the covering or top film) 606 directly onto the first flexible polymer film thereby covering the open expanded cups 602, now having a fruit or vegetable disposed therein. The covered cups may then be inflated and sealed as described herein. Sheets including the first and second polymer films and the inflated cups can be cut and stacked 607 as shown. The hopper 604 may be chilled in some embodiments in order to keep the produce fresh.

Figure 7:
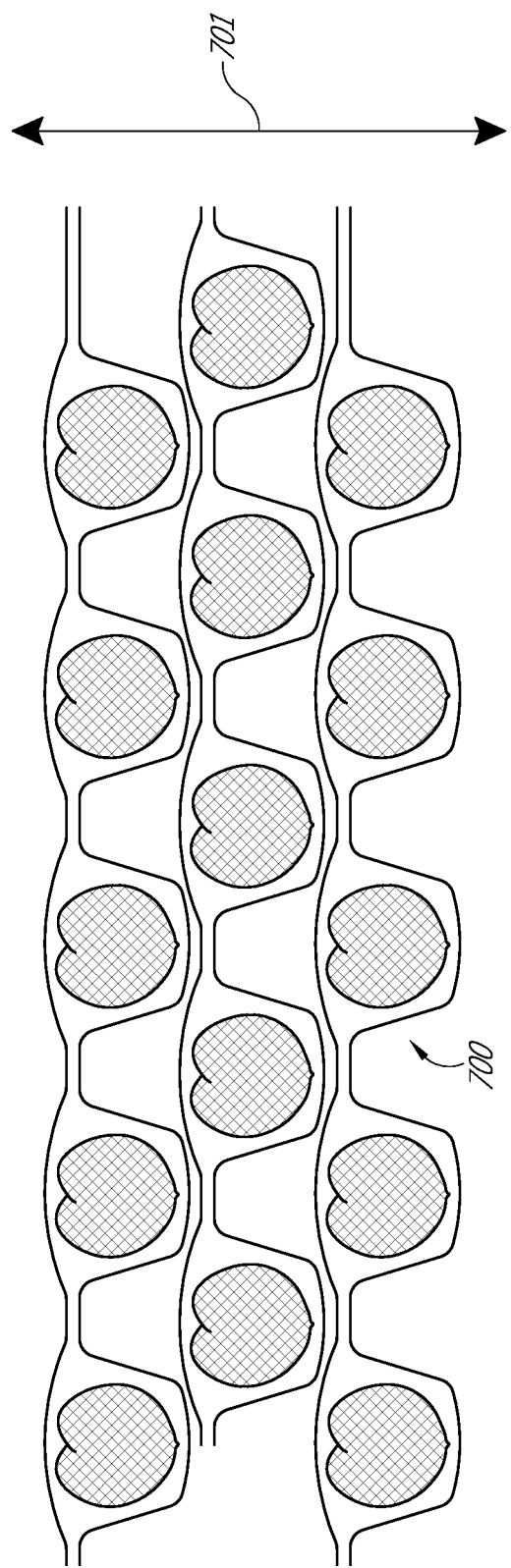
FIG. 7 shows an orientation of the stacking of the sealed fruit in the packages.

The inflated package enables the mat layers to stack more deeply because the weight of the fruit is supported by the gas pressure and not the fruit directly (FIG. 7) preventing the fruit from bruising. The gaps between cups allow cool/chilled air to circulate more readily allowing more even cooling down of the fruit, but the gaps don't have to be as exaggerated as shown in the above Figures. Indeed, the dimensions and gaps are not particularly limiting. For example, the gap could be 5% of the radius of the cup so long as the volumetric packing density is kept reasonably efficient. Since there is also an air gap between the fruit skin and the inside cup, this acts as an insulating barrier. The combination of gaps between cups and between the fruit and a cup means that any cooling may be reasonably achieved throughout the whole box of fruit (note that the fruit may be pre-cooled at the washing stage). The stacking between layers could be hexagonal closed packed (HCP) or face centered cubic (FCC). In some embodiments, a method of packaging a fruit is provided wherein the packages of fruit are layered such that the layers of package are in a stacking orientation of hexagonal closed packed or face centered cubic. As shown in FIG. 7, the package is stacked as hexagonal closed packed (HCP) or face centered cubic (FCC) 700 with deep layering 701.

A benefit of some examples of the disclosed package is that the fruit or vegetable produce can remain packaged until the consumer is ready to eat it, thus preventing mishandling, contamination, etc. For example, a customer may wish to go into a supermarket to buy a particular fruit or vegetable and may prefer to see a neat stack of what they want to purchase. However, customers may instead see the picked-over remains, including damaged pieces. Fruit remnants that are left on the shelf are known to more likely to end up as waste and lost profit. Moreover, the remnants may also lead to accelerated ripening, over-ripening and even rotting. Embodiments may provide advantages including at least one of, and not restricted to, the following: reduced wastage due to spoilage; reduced visible damage to a packaged product; easier stacking of multiple packages within a retail or warehouse environment (particularly as compared to loose product); easier movement of a stack of packaged product, for example by a fork lift or human lifting; protection against external contamination; better control of ripening rates, for example allowing product to arrive at a retail destination when ripe (for example, the concentration of ripening agent(s) and/or anti-ripening agent(s) within a pocket may be adjusted based on, for example, the expected sale time, or transit duration; effective sterilization of a packaged product and subsequent protection against recontamination; reduced theft of a product (for example, undetectable theft of loose items); higher perceived value allowing higher retail prices; better customer control of purchased quantity; and reduced damage to the product due to customer abuse.

Figure 8:
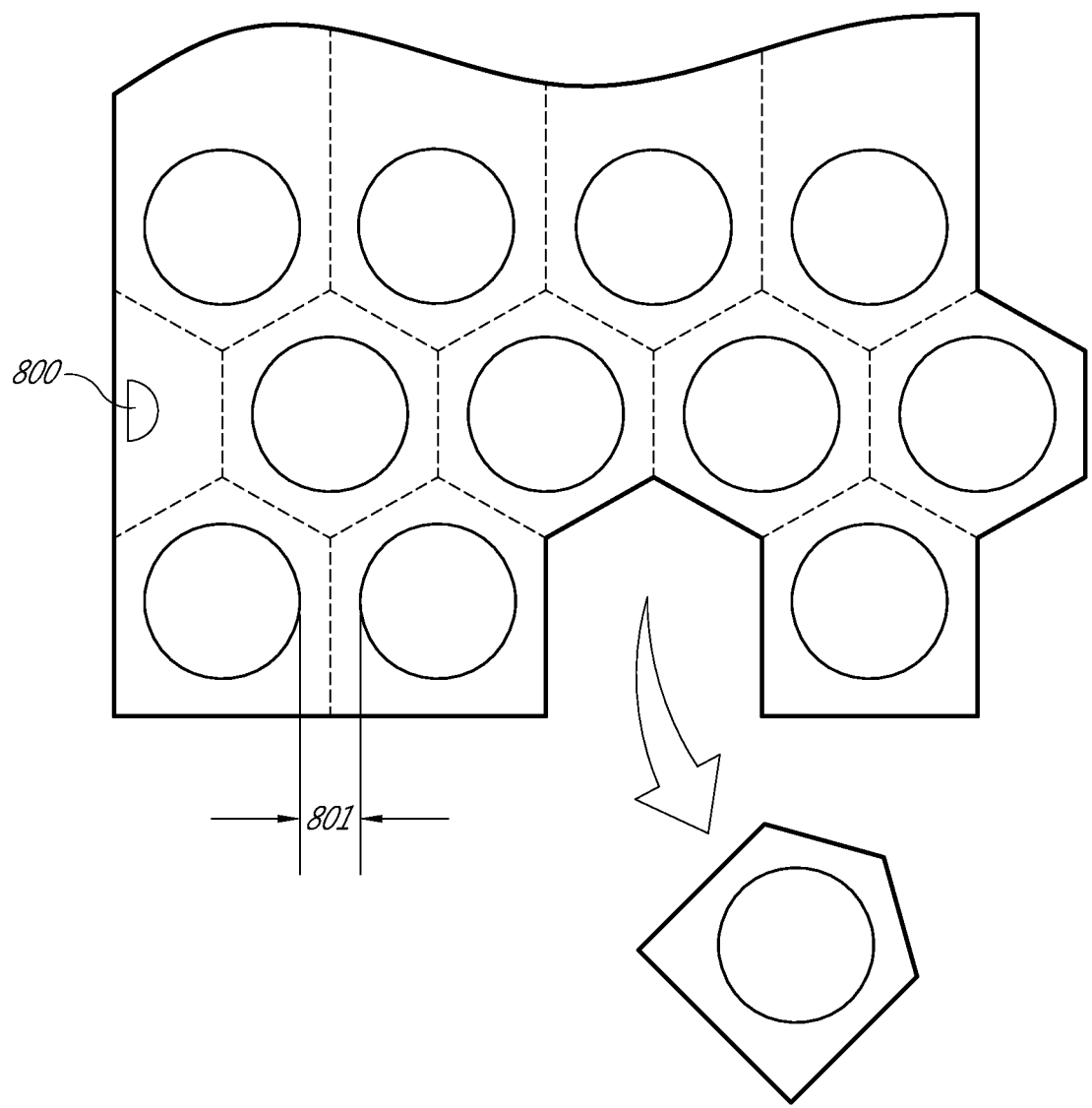
FIG. 8 shows the perforations between the cups which allow tearing off of an individual piece of fruit.

Having the fruit, particularly higher value types, sealed in package allows consumers to break off the number of pieces of fruit that they want with the bubble intact. FIG. 8 shows a plan view of the package featuring hexagonal patterning of the bubbles with perforation around each, although many other patterns are possible depending on the size of the fruit, groupings and how the seller wants to bundle the product. As shown in FIG. 8, are the hook hole 800, and the gaps 801 between the cups.

One of the advantages of having the fruit layered in a mat of bubbles is that the material handling of the fruit can be reduced, particularly the labor costs. Placing each piece of fruit into a box at the farm or the un-packing onto display shelves at the supermarket is a single hand, one or two pieces at a time operation and hence laborious. By placing the fruit in the bubble mat then whole layers of fruit can be lifted in one manual operation so the set up time to display the fruit on a bench as shown in FIG. 8 would be much reduced. One last feature of bubble wrap mat is that the display angle ($\alpha$) can be increased changing the display foot print in the supermarket (FIG. 8). It may be possible to have the packages draped vertically at one extreme, hanging off hooks.

Figure 9:
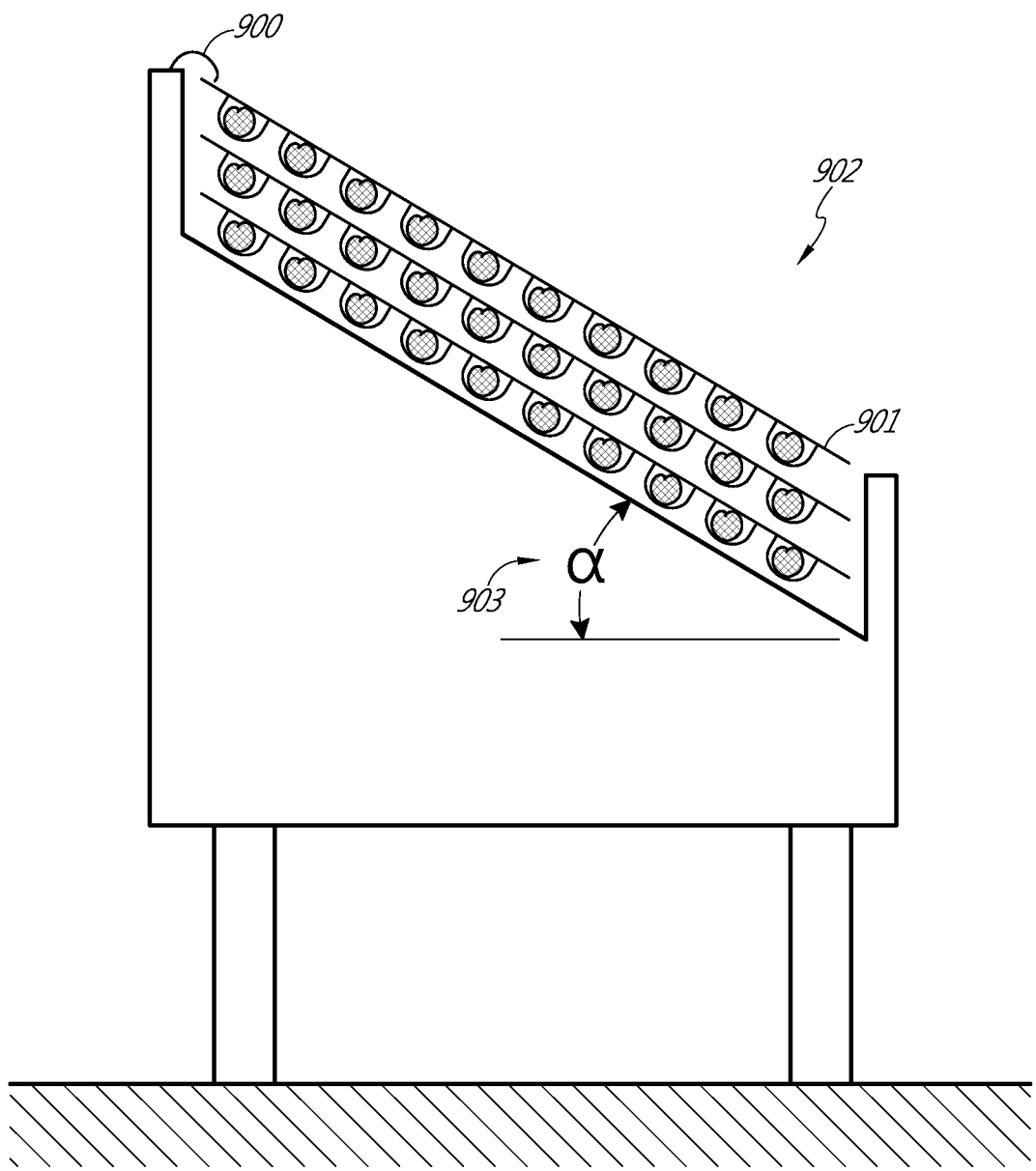
FIG. 9 shows an arrangement of the sheets of fruit packages on a display.

FIG. 9 shows an arrangement of the sheets of fruit packages on a display that allows the sheets of the packaged fruit to be hung on the display by a hook hole that is on the first and second polymer film of the fruit packages. As shown is the hook 900, the display mats 901 in a quick stack 902, and the angle in which they are hung ($\alpha$) 903.

Additional Embodiments

In some embodiments, a package for compartmentalized preservation of harvested fruit or vegetables is provided. In some embodiments, the package comprises a first flexible polymer film, comprising cups, wherein the cups are configured to be collapsed or expanded, thereby forming collapsed or expanded cups, wherein the cups can be expanded by a pulse of compressed gas (such as air), and a second flexible polymer film configured to overlay the first polymer film, thereby forming sealed cups. In some embodiments, the first polymer film comprises a polymer or composite polymer film selected from polypropylene, polyamide (nylon), polyvinyl, polyamide, polylactic acid (PLA), gas impermeable metallized film (PET) or polyethylene terephthalate (PET) laminates, and wherein the second polymer film comprises a polymer or composite polymer barrier film selected from polypropylene, polyamide (nylon), polyvinyl, polyamide, polylactic acid (PLA) gas impermeable metallized film (PET) or polyethylene terephthalate (PET) laminates. In some embodiments, the cups comprise a depth and circumference to accommodate the size of a fruit. In some embodiments, the cups comprise a depth of 2.5, 3, 4, 5, 6, 7, or 8 inches or any other value in a range defined by any two of these values and a circumference of 2.5, 3, 4, 5, 6, 7, or 8 inches or any other value in a range defined by any two of these values, and wherein the cups comprise a distance of 0.2, 0.5, 1, 1.5, or 2 inches from one another or any other value in a range defined by any two of these values. In some embodiments, the cups are vacuum formed, hot air expanded, fluid expanded or 3-D printed. In some embodiments, the cups comprise a small depression at a bottom of the integral molded or vacuum formed cups, wherein the small indentation comprises a circumference of at least 1 inch less than the circumference of the cups and a depth of at least 0.5 inches. In some embodiments, the first polymer film and the second polymer film are pre-spooled for pre-packaging. In some embodiments, the package further comprises an adhesive disposed around the cups, wherein the adhesive is configured to create gas conduits between the first polymer film and the second polymer film when the second polymer film is overlaid on top of the first polymer film, and wherein the adhesive is disposed such that for each cup there is at least a first gas conduit for inflowing air and a second gas conduit for outgoing air, and wherein the adhesive is disposed on the first polymer film or on the second polymer film. In some embodiments, the first polymer film and the second polymer film comprise perforations, wherein the perforations are between the cups on the first polymer film, and wherein the second polymer film comprises perforations that align with the perforations of the first polymer film when the second polymer film is overlaid on top of the first polymer film, thereby allowing tearing off of a single sealed cup. In some embodiments, the package further comprises activated pads, wherein the pads are positioned between the cups within at least one of the gas conduits, and wherein the pads are disposed along the first polymer film or disposed along the second polymer film, wherein the pads are bound to the first polymer film or second polymer film by binder gum or pectin, or the pads are positioned on a structural support on the depression at a bottom or sides of the cups such that the pads are facing the first or second polymer film, or wherein the structural support is disposed on top of the first polymer film such that the structural support is on top of the cups. In some embodiments, the activated pads are gas-absorbing or moisture absorbing pads. In some embodiments, the pads are gas-absorbing pads, wherein the gas absorbing pads comprise activated carbon, a molecular sieve, a zeolite, or calcium oxide. In some embodiments, the pads are moisture absorbing pads, wherein the moisture-absorbing pads comprise a molecular sieve, a zeolite, activated alumina, silica gel or clay such as montemorillomite clay. In some embodiments, the inflowing air and outgoing air comprises $CO_2$, $N_2$ and/or steam. In some embodiments, the gas comprises hydrocarbon volatiles. In some embodiments, the gas comprises $CO_2$. In some embodiments, the binder gum is selected from a group comprising gum Arabic, guar gum, Acacia gum, tamarind gum, locust bean gum, or xyloglucan. In some embodiments, the fruit is selected from a group consisting of bananas, apricots, mangoes, damsons, nectarines, peaches, apples, grapes, figs, kiwis, pears, tomatoes, and plums. In some embodiments, the cups are collapsed into a plane of the first polymer film by collapsing force, thereby forming collapsed cups or wherein the cups are expanded for fruit placement by a pulse of compressed air, thereby forming expanded cups. In some embodiments, the first polymer film comprises a hook hole and the second polymer film comprises a hook hole, wherein the hook hole for the first polymer film and the second polymer film align such that when the second polymer film is overlaid upon the first polymer film the hook holes align, thereby forming a hook hole that aligns on the first and the second polymer film. In some embodiments, at least one of the polymer films comprises preprinted product logo and/or livery information.

In some embodiments, a method of packaging fruit or vegetable is provided. In some embodiments, the method can comprise providing washed and pre-cooled fruit or vegetable, providing a package of the fruit or vegetable wherein the package comprises a first flexible polymer film, comprising cups, wherein the cups are configured to be collapsed or expanded, thereby forming collapsed or expanded cups, and wherein the cups can be expanded by a pulse of compressed gas (such as air), and a second flexible polymer film configured to overlay the first polymer film, unspooling the first polymer film of the package, unspooling the second polymer film of the package, forming the cups of the first polymer film by pulsing compressed air onto the cups, thereby forming expanded cups, placing the fruit or vegetable into each expanded cup, overlaying the second polymer film over the first polymer film, bonding the second polymer film over the first polymer film thereby forming semi-sealed cups, pumping air into the semi-sealed cup and sealing holes and conduits between the cups under conditions, thereby forming a sealed package with sealed cups.

In some embodiments, the first polymer film comprises a polymer or composite polymer film selected from polypropylene, polyamide (nylon), polyvinyl, polyamide, polylactic acid (PLA), gas impermeable metallized film (PET) or polyethylene terephthalate (PET) laminates, and wherein the second polymer film comprises a polymer or composite polymer barrier film selected from polypropylene, polyamide (nylon), polyvinyl, polyamide, polylactic acid (PLA) gas impermeable metallized film (PET) or polyethylene terephthalate (PET) laminates. In some embodiments, the first polymer film and the second polymer film are pre-spooled for pre-packaging. In some embodiments, the first polymer film and/or the second polymer film may be a metallized polymer film, and for example may include a polymer film supporting a layer of metal, such as aluminum, which may reduce gas permeability.

In some embodiments, an example package may further comprise an adhesive disposed around the cups. In some examples, the adhesive is configured to create gas conduits between the first polymer film and the second polymer film when the second polymer film is overlaid on top of the first polymer film, and wherein the adhesive is disposed such that for each cup there is at least a first gas conduit for inflowing air and a second gas conduit for outgoing air, and wherein the adhesive is disposed on the first polymer film or the second polymer film. In some embodiments, the cups comprise a depth of 2.5, 3, 4, 5, 6, 7, or 8 inches or any other value in a range defined by any two of these values and a circumference of 2.5, 3, 4, 5, 6, 7, or 8 inches or any other value in a range defined by any two of these values, and wherein the cups comprise a distance of 0.2, 0.5, 1, 1.5, or 2 inches from one another or any other value in a range defined by any two of these values. In some embodiments, the cups comprises a small depression at a bottom of the cups, wherein the small indentation comprises a circumference of at least 1 inch less than the circumference of the cups and a depth of at least 0.5 inches.

In some embodiments, the first polymer film and the second polymer film comprise perforations, wherein the perforations are between the cups on the first polymer film, and wherein the second polymer film comprises perforations that align with the perforations of the first polymer film when the second polymer film is overlaid on top of the first polymer film, thereby allowing tearing off of a single sealed cup.

In some embodiments, the package further comprises activated pads, wherein the pads are in fluid communication with at least some of the cups. In some embodiments, the pads are gas-absorbing pads or the pads are moisture-absorbing pads. In some embodiments, the pads comprise activated carbon, a zeolite, or calcium oxide. In some embodiments, the pads are gas-absorbing pads, wherein the gas absorbing pads comprise activated carbon, a molecular sieve, a zeolite, or calcium oxide, or wherein the pads are moisture-absorbing pads, wherein the moisture-absorbing pads comprise a molecular sieve, a zeolite, activated alumina, silica gel or montemorillomite clay. In some embodiments, the pads are positioned between the cups within at least one of the gas conduits disposed along the first polymer film or disposed along the second polymer film, wherein the pads are bound to the first polymer film or second polymer film by binder gum or pectin, or the pads are positioned on a structural support on depression at a bottom or sides of the cups such that the pads are facing the first or second polymer film, or the structural support is disposed on top of the first polymer film such that the structural support is on top of the cups.

In some embodiments, the inflowing air and outgoing air comprises air, $CO_2$, $N_2$, and/or steam. In some embodiments, the gas comprises hydrocarbon volatiles. In some embodiments, the gas comprises $CO_2$ and/or hydrogen sulfide. In some embodiments, the binder gum is selected from a group consisting of gum Arabic, guar gum, Acacia gum, tamarind gum, locust bean gum, and xyloglucan. In some embodiments, the fruit is selected from a group consisting of bananas, apricots, mangoes, damsons, nectarines, peaches, apples, grapes, figs, kiwis, pears, tomatoes, and plums.

In some embodiments, the first polymer film comprises a hook hole and the second polymer film comprises a hook hole, wherein the hook hole for the first polymer film and the second polymer film align such that when the second polymer film is overlaid upon the first polymer film the hook holes align, thereby forming a hook hole that aligns on the first and the second polymer film. In some embodiments, at least one of the polymer films comprises preprinted product logo and/or livery information. In some embodiments, bonding comprises applying adhesive by hot glue melt or welding or applying pressure and heat to the package. In some embodiments, the pumping is performed by food grade bottled gas cylinders. In some embodiments, the air comprises $CO_2$, $N_2$, and/or steam. In some embodiments, the sealing further comprises applying adding adhesive, heat and/or pressure to the package, thereby forming an air tight seal. In some embodiments, the conditions comprise a pressure of 1, 5, 10, 15, 20, 25, 30, 35, 40, 45 or 50 kPa or any other value in a range defined by any two of these values.

In some embodiments, the placing of produce into the expanded cups is performed by hopper machinery. In some embodiments, the method further comprising cutting the package after the sealing step, wherein the cutting is performed by a cutter to separate the sealed package, thereby forming a sheet of sealed package for layering, and wherein the sheet comprises a weight of 1, 2, 3, 4, 5, 6, 7, 8, 9 or 10 kg or any other value in a range defined by any two of these values and the sheet comprises an area of 10 square inches, 500 square inches, 625 square inches, 1000 square inches, 1500 square inches, 2000 square inches or 2500 square inches or any other value in a range defined by any two of these values. In some embodiments, an area of 10 square inches is used for single pieces of fruit. In some embodiments, the method further comprises layering the sheets of sealed packages into boxes or a retail display, such that a top layer of sealed package is overlaid on top of a bottom layer such that individual cups are placed in an orientation between the individual cups of a bottom layer of the sealed package, thereby forming air gaps between the individual cups of the sheets of the sealed package, and wherein the orientation comprises a hexagonal closed packed or face center cubic packed stacking of the sheets of sealed packages. In some embodiments, the method further comprises hanging the sheets of sealed packages on hooks by the hook hole in a retail display wherein the sealed packages are hanging vertically or at an angle from the hook hole.

In some embodiments, a packaged fruit product is provided. In some embodiments, the packaged fruit product comprises one or more individual pieces of harvested, optionally pre-washed (or otherwise pretreated) fruit and a package configured for compartmentalized storage of the one or more individual pieces of fruit, the package comprising: a first flexible polymer film, comprising one or more cups, wherein the cups are configured to be collapsed or expanded, thereby forming collapsed or expanded cups, and wherein the cups can be expanded by a pulse of compressed gas (such as air) and configured to accommodate an individual piece of fruit and a second flexible polymer film, wherein the second flexible polymer film is configured to overlay the first polymer film and wherein the second flexible polymer film is bound to the first polymer film, thereby sealing the one or more individual pieces of fruit within their respective cups, thereby forming a sealed cup and sealed package. In some embodiments, the fruit is selected from a group consisting of bananas, apricots, mangoes, damsons, nectarines, peaches, apples, grapes, figs, kiwis, pears, tomatoes, and plums. In some example, fruit may comprise a whole fruit, for example, a berry and the like. In some example, fruit may include portions of a whole fruit, such as a banana slice, pineapple segment, apple slice, citrus fruit segment, and the like.

In some embodiments, a package for a plant item (such as a fruit, vegetable, fungus, leaf, stem, bulb, corm, rhizome, and the like) comprises a pocket formed between first and second polymer sheets. In some examples, a pocket may be formed by a cup within the first polymer sheet and a generally planar second polymer sheet. In some examples, the second polymer sheet may be thicker than the first polymer sheet. In some examples, cups may be provided by first and second polymer sheets. In some examples, the cups may be formed by stretching of first and/or second polymer sheets during the packaging process.

A plant item may be located within a cup, between interior surfaces provided by the first and second polymer sheets. In some examples, a cup used to package the plant item may also comprise therein a fluid, such as a gas, liquid, gel, emulsion, foam, and the like. In some examples, the fluid may comprise one or more gaseous components, such as an inert gas (such as nitrogen, argon and the like), a gaseous ripening agent such as acetylene, and the like. In other examples, a fluid may comprise a liquid, such as an aqueous liquid, such as brine. A fluid may comprise additional components, for example in solution or suspension.

A cup may comprise a ripening agent, a desiccant, a liquid water absorber (such as a polyacrylate gel), an anti-pathogenic agent, and the like. Such additional components may be introduced into (or be otherwise supported by) at least one of: the first polymer film, the second polymer film (e.g., on an interior surface of a pocket), a fruit or vegetable surface, a fluid within the cup, or a support structure such as a pad located in or otherwise in fluid communication with the cup.

In some examples, a packaging process may further comprise further processing of the plant item, for example before, during, or after encapsulation by the cup. Further processing may comprise irradiation (e.g., by ionizing radiation, light, microwaves, or thermal radiation, e.g., to pasteurize, sterilize and/or cook the plant item), mechanical processing (e.g., to break up, shell, or soften a plant item), and the like.

In some examples, the interior surface of the first and/or second polymer sheets generally encapsulating the plant item within the pocket may support a preserving agent. A preserving agent may absorb moisture, gases, and the like, and may be selected to preserve freshness and/or improve appearance. A preserving agent may comprise a desiccant such as a silica gel or other desiccated or dried hydrophilic material. A preserving agent may comprise a pad adhered to an inner surface of the cup, for example using a binder such as a gum or an edible paste.

A package may further comprise a temperature sensor, a gas sensor, an indicator (for example, an element that changes color in the presence of an analyte, for example to indicate freshness), a bar code or other data representation, and the like.

In some examples, a cup may include a liquid, for example, a cup may be filled with a liquid, such as an aqueous liquid such as brine. A cup may include a gel, an emulsion, other fluid medium, and the like.

In some examples, a third polymer layer may be adhered to portions of pockets distal to the first polymer sheet, so that an arrangement of pockets is sandwiched between two generally planar polymer layers.

In some examples, an arrangement of cups may comprise cups that do not contain a plant item, such as a fruit. These may be termed empty cups, though these may be filled with a fluid, such as a gas, liquid, gel, emulsion, foam, and the like. Empty pockets may be used to improve protection of plant items in adjacent or proximate pockets. In some examples, contents of a cup, such as a fruit or vegetable, may be cooked, blanched, sterilized, heat treated, irradiated, or otherwise treated after deposition in a cup. For example, the cups may be filled with steam. The first and second polymer films may comprise polymers that can withstand heat, e.g., from steam treatment or other heat treatment.

The foregoing detailed description of embodiments refers to the accompanying drawings, which illustrate specific embodiments of the present disclosure. Other embodiments having different structures and operations do not depart from the scope of the present disclosure. The term "the invention" or the like is used with reference to certain specific examples of the many alternative aspects or embodiments of the applicants' invention set forth in this specification, and neither its use nor its absence is intended to limit the scope of the applicants' invention or the scope of the claims. This specification is divided into sections for the convenience of the reader only. Headings should not be construed as limiting of the scope of the invention. The definitions are intended as a part of the description of the invention. It will be understood that various details of the present invention may be changed without departing from the scope of the present invention. Furthermore, the foregoing description is for the purpose of illustration only, and not for the purpose of limitation.

All publications, including patent documents and scientific articles, referred to in this application and the bibliography and attachments are incorporated by reference for the referenced materials and in their entireties for all purposes to the same extent as if each individual publication were individually incorporated by reference.

Citation of the above publications or documents is not intended as an admission that any of the foregoing is pertinent prior art, nor does it constitute any admission as to the contents or date of these publications or documents.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention. The various embodiments of the invention should be understood that they have been presented by way of example only, and not by way of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described. They instead can, be applied, alone or in some combination, to one or more of the other embodiments of the invention, whether or not such embodiments are described, and whether or not such features are presented as being a part of a described embodiment. Thus the breadth and scope of the invention should not be limited by any of the above-described exemplary embodiments.

Terms and phrases used in this document, and embodiments thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead, these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless apparent from the context or expressly stated otherwise. Similarly, a group of items linked with the conjunction "or" should not be read as requiring mutual exclusivity among that group, but rather should also be read as "and/or" unless it is apparent from the context or expressly stated otherwise. Furthermore, although items, elements or components of the invention may be described or claimed in the singular, the plural is contemplated to be within the scope thereof unless limitation to the singular is explicitly stated. For example, "at least one" may refer to a single or plural and is not limited to either. The presence of broadening words and phrases such as "one or more," "at least," "but not limited to", or other like phrases in some instances shall not be read to mean that the narrower case is intended or required in instances where such broadening phrases may be absent.

What is claimed is:

1. A method for packaging fruits or vegetables, the method comprising:
   unspooling a first flexible polymer film in a form of a flat sheet comprising cups, wherein each cup is configured to be expanded from a collapsed state disposed within the flat sheet to an expanded cup, comprising a depth and a circumference configured to accommodate the fruits or vegetables;
   expanding each cup from its collapsed state cup disposed within the flat sheet to an expanded cup by a flow of compressed gas;
   placing the fruits or vegetables into the expanded cup;
   unspooling a second flexible polymer film;
   overlaying the first polymer film and the expanded cup holding the fruits or vegetables with the second polymer film;
   partially bonding the second polymer film to the first polymer film, such that at least one gas conduit is formed for each cup between the first and second polymer films allowing air to flow into each expanded cup;
   inflating the expanded cups by pumping a gas through the at least one gas conduit, thereby forming inflated cups; and
   sealing the at least one gas conduit, thereby sealing the fruits or vegetables within each inflated cup, thereby forming a sealed package.

2. The method of claim 1, further comprising forming perforations between the sealed cups, thereby allowing tearing off one or more single sealed cups.

3. The method of claim 1, further comprising positioning at least one of a gas absorbing or moisture absorbing activated pads in fluid communication with at least some of the cups.

4. The method of claim 3, wherein the at least one of a gas absorbing or moisture absorbing activated pads are positioned within the at least one gas conduit and held in place using a binder gum or a pectin, or the at least one of a gas absorbing or moisture absorbing activated pads are positioned within a depression along a bottom or side surface of the expanded cups.

5. The method of claim 4, wherein the binder gum is selected from the group consisting of gum Arabic, guar gum, Acacia gum, tamarind gum, locust bean gum, and xyloglucan.

6. The method of claim 1, wherein the gas comprises air, $CO_2$, $N_2$, hydrogen sulfide, steam, or any combinations thereof.

7. The method of claim 1, wherein the gas comprises hydrocarbon volatiles.

8. The method of claim 1, wherein the fruits are selected from the group consisting of bananas, apricots, mangoes, damsons, nectarines, peaches, apples, grapes, figs, kiwis, pears, tomatoes and plums.

9. The method of claim 1, wherein the partial bonding comprises applying adhesive by hot glue melt or welding, or applying pressure and heat to the polymer films.

10. The method of claim 1, wherein the pumping is performed using food grade pressurized bottled gas cylinders.

11. The method of claim 1, wherein the sealing comprises applying adhesive, heat or pressure or combinations thereof to the package, thereby closing the gas conduits and forming an air tight seal.

12. The method of claim 1, wherein placing the fruits or vegetables is performed using hopper machinery.

13. The method of claim 1, further comprising cutting the sealed package, thereby forming a sheet of sealed packages for layering.

14. The method of claim 13, further comprising layering the sheets of sealed packages into boxes or a retail display, such that a top layer of the sealed packages is overlaid on top of a bottom layer such that individual sealed cups of the top layer are placed in an orientation between the individual sealed cups of the bottom layer, thereby forming air gaps between the cups.

15. A method for packaging fruits or vegetables, the method comprising:
   unspooling a first flexible polymer film in a form of a flat sheet comprising cups, wherein each cup is configured to be expanded from a collapsed state disposed within the flat sheet to an expanded cup, comprising a depth and a circumference configured to accommodate the fruits or vegetables;
   expanding each cup from its collapsed state cup disposed within the flat sheet to an expanded cup by a flow of compressed gas;
   placing the fruits or vegetables into the expanded cup;
   unspooling a second flexible polymer film;
   overlaying the first polymer film and the expanded cup holding the fruits or vegetables with the second polymer film;
   partially bonding the second polymer film to the first polymer film, such that at least one gas conduit is formed for each cup between the first and second polymer films allowing air to flow into each expanded cup, wherein at least one of a gas absorbing or moisture absorbing activated pad is positioned within the at least one gas conduit;
   inflating the expanded cups by pumping a gas through the at least one gas conduit, thereby forming inflated cups; and
   sealing the at least one gas conduit, thereby sealing the fruits or vegetables within each inflated cup, thereby forming a sealed package.

16. The method of claim 15, wherein the at least one of a gas absorbing or moisture absorbing activated pads positioned within the at least one gas conduit are held in place using a binder gum or a pectin.

* * * * *